(12) United States Patent
Yokoi et al.

(10) Patent No.: US 8,097,688 B2
(45) Date of Patent: Jan. 17, 2012

(54) INK COMPOSITION AND INKJET RECORDING METHOD

(75) Inventors: Kazuhiro Yokoi, Kanagawa (JP); Tokihiko Matsumura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 155 days.

(21) Appl. No.: 12/715,415

(22) Filed: Mar. 2, 2010

(65) Prior Publication Data

US 2010/0227076 A1 Sep. 9, 2010

(30) Foreign Application Priority Data

Mar. 9, 2009 (JP) ................................. 2009-055460

(51) Int. Cl.
*C08F 12/20* (2006.01)
*C08F 28/06* (2006.01)
*C08F 12/24* (2006.01)
*C08F 118/02* (2006.01)
*B41M 5/00* (2006.01)
*C08J 7/04* (2006.01)
*C08G 63/48* (2006.01)

(52) U.S. Cl. ..................... 526/242; 428/195.1; 427/504; 525/70; 526/256; 526/313; 526/319

(58) Field of Classification Search .................. 526/242, 526/256, 313, 319; 428/195.1; 525/70; 427/504
See application file for complete search history.

(56) References Cited

U.S. PATENT DOCUMENTS

| 2004/0163570 A1 | 8/2004 | Vanmaele et al. |
| 2006/0014852 A1 | 1/2006 | Loccufier et al. |
| 2006/0194029 A1* | 8/2006 | Tsujihata .................. 428/195.1 |

FOREIGN PATENT DOCUMENTS

| EP | 2033949 A | 3/2009 |
| EP | 2088177 A | 8/2009 |
| JP | 2002-167537 A | 6/2002 |
| JP | 2004-506639 T | 3/2004 |
| WO | 03/033452 A | 4/2003 |
| WO | 03/033492 A | 4/2003 |

* cited by examiner

*Primary Examiner* — William Cheung
(74) *Attorney, Agent, or Firm* — Solaris Intellectual Property Group, PLLC

(57) ABSTRACT

The present invention provides an ink composition containing (A) a polymer compound having (a-1) a photoradical generation site and (a-2) at least one segregation site selected from a fluoroalkyl group, a siloxane structure, and a long-chain alkyl group, (B) a radical-polymerizable compound, and (C) a photoradical generator having a structure different from that of (A).

6 Claims, No Drawings

INK COMPOSITION AND INKJET RECORDING METHOD

CROSS-REFERENCE TO RELATED APPLICATION

This application claims priority under 35 USC 119 from Japanese Patent Application No. 2009-055460 filed on Mar. 9, 2009, the disclosure of which is incorporated by reference herein.

BACKGROUND

1. Field of the Invention

The present invention relates to an ink composition and an inkjet recording method and in particular to an ink composition and an inkjet recording method which are used preferably for inkjet recording by curing with high sensitivity, by irradiation with active energy rays.

2. Related Art

An image recording method of forming an image on a recording medium such as paper based on an image data signal includes an electrophotographic method, sublimation and fusion type thermal transfer methods and an inkjet method. Particularly the inkjet system involves jetting an ink onto necessary image regions with an inexpensive apparatus thereby forming the image directly on a recording medium, thus enabling effective use of ink and reduction in running costs. Moreover, the inkjet system is excellent as an image recording system because of fewer noises.

The inkjet system allows printing not only on plain paper but also on non-water-absorptive recording media such as plastic sheet and metal plate, but represents important issues for higher speed in printing and for higher image properties and suffers from drying of droplets after printing and the time required for curing, thus having a property of being significantly influenced by productivity of prints and the sharpness of printed images.

As one inkjet system, there is a recording system of using a curable inkjet recording ink by irradiation with radiations. This system involves irradiation with radiations immediately after ink jetting or within a given time period after jetting, to cure ink droplets thereby improving productivity in printing to form sharp images.

By achieving higher sensitivity in an inkjet recording ink that can be cured by exposure to radiations such as ultraviolet rays, the ink produces a large number of benefits such as high curability conferred toward radiations, improvement in productivity of inkjet recording, reduction in power consumption, longer lifetime due to decrease in the load on a radiation generator, and prevention of formation of low-molecular-weight material volatilizing from insufficient curing. The achievement in higher sensitivity leads in particular to improvement in the strength of images formed from the inkjet recording ink.

Preferable properties of images formed from the ink include adhesiveness to a substrate and flexibility of images. Particularly when images are formed on the surface of an uneven substrate or on the surface of a flexible substrate such as a resin film and further when a print molding (for example a resin bottle) having a molding formed in a state provided thereon with a print is formed, the flexibility of images becomes an important factor and is made hardly compatible with curability. That is, when the ratio of monofunctional monomers is increased for improving flexibility, there may be causes wherein curability is decreased or the image surface tackiness is caused due to blurring of uncured low-molecular-weight components. Generation of surface tackiness results in the blocking of prints formed from an ink composition, deterioration in workability, and deterioration in images formed, so there has been demand for suppression thereof.

For improving adhesiveness, flexibility and curability, techniques of using low-viscosity urethane acrylates in an inkjet ink composition have been proposed (see, for example, Japanese Patent Application Laid-Open (JP-A) No. 2002-167537). However, this ink composition hardly maintains sufficient curability when the content of monofunctional monomers is increased to form a more flexible ink film.

Curable ink compositions, particularly radical-polymerizable ink compositions, are liable to polymerization inhibition with oxygen adjacent to the surfaces of images formed and are considered subject to surface tackiness attributable to reduction in the curing property of the surfaces. Accordingly, techniques wherein surface-oriented functional groups are introduced into a polymerization initiator and distributed unevenly on the surface of the polymerization initiator have been proposed (see, for example, Japanese Patent Application National Publication (Laid-Open) No. 2004-506639).

However, the compound having an ability to initiate polymerization as described herein has failed to sufficiently attain an effect of suppressing the blocking caused by surface tackiness due to a low glass transition temperature of the compound.

SUMMARY

The present invention has been made in view of the above circumstances and provides an ink composition containing (A) a polymer compound having (a-1) a photoradical generation site and (a-2) at least one segregation site selected from a fluoroalkyl group, a siloxane structure, and a long-chain alkyl group, (B) a radical-polymerizable compound, and (C) a photoradical generator different from that of (A).

DETAILED DESCRIPTION OF THE INVENTION

The inventors made extensive study, and as a result, they found that a polymer compound having, in its molecule, a photoradical generation site and a surface segregation site can be added to solve the problem, thereby completing the invention.

The working effect of the invention is not evident and is estimated as follows.

It is estimated in the invention that when (A) the polymer compound ("specific polymer") having (a-1) a photoradical generation site and (a-2) at least one segregation site selected from a fluoroalkyl group, a siloxane structure, and a long-chain alkyl group is added to an ink composition, the polymer compound having an ability to initiate polymerization is distributed unevenly on the surface of an image formed from the ink composition, and therefore, the polymerization initiator becomes unevenly distributed in the outermost region that is usually hardly curable due to high polymerization inhibition with oxygen at high density, thereby improving the curability of the outermost surface, improving abrasion resistance and simultaneously segregating the polymer compound in the surface, thus improving blocking resistance. Because the polymer compound is unevenly distributed in the surface, it is considered that low-molecular components are prevented from leaching out and tack is not deteriorated.

In a deep part of the image that is hardly influenced by inhibition with oxygen, (C) another photoradical generator and (B) a radical-polymerizable compound, which are contained in the ink composition of the invention, proceed polymerization and curing efficiently thereby rapidly forming the ink image prevented from blocking.

In a preferable aspect of the invention, the weight-average molecular weight of (A) the specific polymer is set in the range of 5000 to 100000 and the glass transition temperature (Tg) of the specific polymer in the range of 20 to 180° C., whereby low-molecular-weight components can be effectively prevented from volatilizing and leaching out, and blocking resistance is further improved. By further introducing polymerizable groups into (A) the specific polymer, the curability of the surface is improved, and sensitivity and blocking depression effect are further improved.

Hereinafter, the invention will be described in detail.

[Ink Composition]

The ink composition of the invention contains (A) a polymer compound having (a-1) a photoradical generation site and (a-2) at least one segregation site selected from a fluoroalkyl group, a siloxane structure, and a long-chain alkyl group, (B) a radical-polymerizable compound, and (C) a photoradical generator different from that of (A).

<(A) Polymer Compound Having (a-1) a Photoradical Generation Site and (a-2) at Least One Segregation Site Selected from a Fluoroalkyl Group, a Siloxane Structure, and a Long-Chain Alkyl Group>

(A) The specific polymer used in the invention has, in a molecule, (a-1) a photoradical generation site and (a-2) at least one segregation site selected from a fluoroalkyl group, a siloxane structure, and a long-chain alkyl group.

(a-1) The photoradical generation site is not particularly limited as long as it has a partial structure for generating radicals by decomposition with active energy, or by generating hydrogen abstraction reaction, and the photoradical generation site may be present in the main chain or side chain of the specific polymer.

When the photoradical generation site can be introduced via a covalent bond into the polymer compound, any of known existing photoradical initiation structures can be used without limitation. In particular, as a preferable structure, an initiation site in a polymer type initiator described on pp. 204-225 in Chemistry & Technology of UV & EB Formulation for Coatings, Ink & Paints can be preferably used.

As the method of introducing such partial structure, a method of introducing the partial structure by polymer reaction or a method of copolymerizing a structural unit having such partial structure thereby introducing the partial structure can be used, but from the viewpoint of easiness in regulation of the amount of the structure to be introduced, the method of copolymerizing the structural unit having a photoradical generation site is preferable.

More specifically, the structural units represented by formulae (a-1-1) to (a-1-9) below are preferably introduced by the method of copolymerization.

In the formulae, (a-1) the photoradical generation site is introduced by inclusion of the structural units represented by the formulae (a-1-1) to (a-1-7) into a side chain of the specific polymer and by inclusion of the structural units represented by the formulae (a-1-8) and (a-1-9) into the main chain of the specific polymer.

Hereinafter, preferable structural units that constitute the specific polymer in the invention will be described.

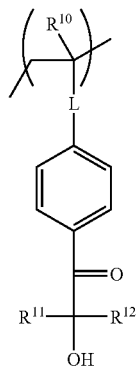

(a-1-1)

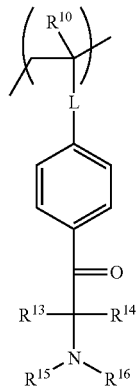

(a-1-2)

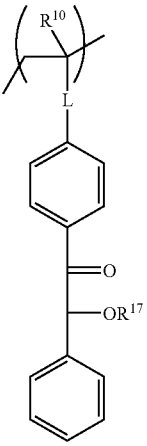

(a-1-3)

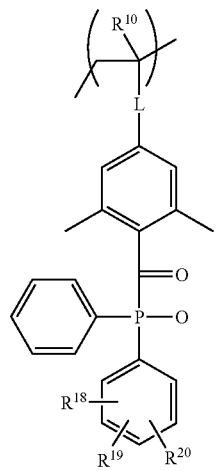

(a-1-4)

In the formulae (a-1-1) to (a-1-4), $R^{10}$ represents a hydrogen atom or a methyl group, preferably a methyl group.

L represents a single bond or a divalent linking group. When L represents a divalent linking group, the linking group is specifically an alkylene group having 1 to 20 carbon atoms, an alkenylene group having 2 to 10 carbon atoms, an alkynylene group having 2 to 10 carbon atoms or an alkylene group having 1 to 20 carbon atoms, where in the alkyl chain, one or more kinds of non-consecutive oxygen atoms, sulfur atoms, ester bonds, urethane bonds, urea bonds and thiourea bonds may be included, as well as phenylene groups which may have a substituent.

The linking group represented by L may be unsubstituted, or when the linking group has a substituent, the substituent capable of introduction into it includes an unsubstituted linear or branched alkyl group having 1 to 12 carbon atoms, a hydroxyl group, an alkoxy group having 1 to 4 carbon atoms, an alkyl group having 1 to 12 carbon atoms which is substituted with a phenyl group, an alkyl group having 2 to 12 carbon atoms which has 1 or more non-consecutive oxygen atoms in a chain, a phenyl group, a carbonyl group, and a sulfonyl group, and L may have one or more of these groups, and when there are these plural substituents, they may be the same or different.

$R^{11}$, $R^{12}$, $R^{13}$ and $R^{14}$ each independently represent a linear, branched or cyclic hydrocarbon group having 1 to 12 carbon atoms which may have a substituent and $R^{11}$ and $R^{12}$, and $R^{13}$ and $R^{14}$, may be bound to each other to form a cyclic structure having 8 carbon atoms or less constituting the cycle.

Particularly, $R^{11}$ is preferably an alkyl group having 1 to 12 carbon atoms, an unsubstituted phenyl group, or a phenyl group substituted with an alkyl group having 1 to 4 carbon atoms, and $R^{12}$ is preferably a hydrogen atom, an unsubstituted alkyl group having 1 to 8 carbon atoms, an alkyl group having 1 to 8 carbon atoms which is substituted with an OH group or an alkoxy group having 1 to 4 carbon atoms, an unsubstituted phenyl group, a phenyl group substituted with a hydroxyl group, an alkyl group having 1 to 4 carbon atoms, and an alkoxy group having 1 to 4 carbon atoms; an alkylene group having 1 to 12 carbon atoms which may contain a heteroatom, an ethyleneoxide group, a propyleneoxide group, an alkylester group, a phenylene group, or a phenyl alkyl group. $R^{11}$ may further have a substituent introduced into it, and the substituent capable of introduction into it includes a hydroxyl group, a halogen atom, a thioether group and a phenyl group.

$R^{15}$ and $R^{16}$ each independently represent a linear, branched or cyclic hydrocarbon group having 1 to 12 carbon atoms which may have a substituent. $R^{15}$ and $R^{16}$, together with a nitrogen atom bound thereto, are bound to a carbon atom constituting $R^{15}$ and $R^{16}$— or may together with a carbon atom form a 5-, 6- or 7-memberred ring including —O— or an amino group.

Each of $R^{15}$ and $R^{16}$ is preferably a hydrocarbon group having 1 to 12 carbon atoms, an unsubstituted phenyl group, a phenyl group substituted with one kind or more substituent selected from an alkyl group having 1 to 4 carbon atoms, and an alkoxy group having 1 to 4 carton atoms.

The substituents that can be introduced into $R^{15}$ and $R^{16}$ include those substituents capable of introduction into the linking group L.

$R^{17}$ represents a hydrogen atom or a linear or branched alkyl group having 1 to 6 carbon atoms, and $R^{18}$, $R^{19}$, and $R^{20}$ each independently represent a hydrogen atom or a hydrocarbon group having 1 to 12 carbon atoms.

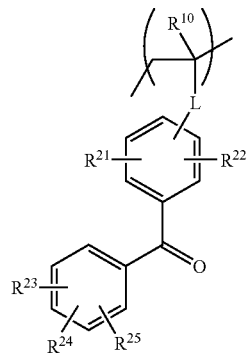

(a-1-5)

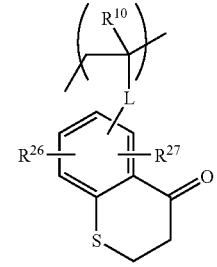

(a-1-6)

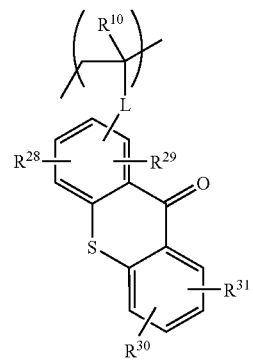

(a-1-7)

In the formula (a-1-5), $R^{21}$, $R^{22}$, $R^{23}$, $R^{24}$ and $R^{25}$ each independently represent a hydrogen atom, a linear, branched or cyclic alkyl group having 1 to 8 carbon atoms which may have a substituent, a phenyl group which may have a substituent, a hydroxyl group, an alkyl group-substituted amine group, or a cyano group, and two of $R^{21}$, $R^{22}$, and may be bound to each other to form a ring structure.

Specifically, with respect to the phenyl group to which groups $R^{23}$ to $R^{25}$ are to be bound, it is preferably a structure which is unsubstituted or a mono-substituent at position 4 relative to carbonyl, more preferably unsubstituted or a mono-substituent at position 4 relative to carbonyl with a phenyl group, a phenoxy group, a cyano group, a hydroxyl group, a methoxy group, a methyl group or a dimethylamino group.

In the formula (a-1-6), $R^{26}$ and $R^{27}$ each represent a hydrogen atom, an alkyl group having 1 to 6 carbon atoms, or a halogen atom.

Specifically, $R^{26}$ and $R^{27}$ each represent a methyl group, an ethyl group, a chlorine atom or a bromine atom, preferably a methyl group.

In the formula (a-1-7), $R^{28}$, $R^{29}$, $R^{39}$ and $R^{31}$ each independently represent a linear or branched alkyl group having 1 to 6 carbon atoms, a halogen atom, or a hydroxyl group.

More specific examples of $R^{28}$, $R^{29}$, $R^{30}$, and $R^{31}$ include a methyl group, an ethyl group, an isopropyl group, a 2-ethylhexyl group, a chlorine atom, a bromine atom and a fluorine atom, preferably a methyl group, an isopropyl group and a chlorine atom.

In the formulae (a-1-5) to (a-1-7), $R^{10}$ and L have the same meanings as defined in the formula (a-1-1), and preferable examples thereof are also the same as defined therein.

Hereinafter, structural units for introduction of (a-1) the photoradical generation site into the side chain will be illustrated, but the invention is not limited thereto.

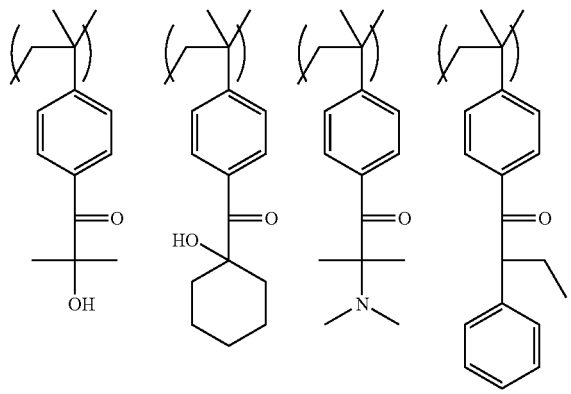

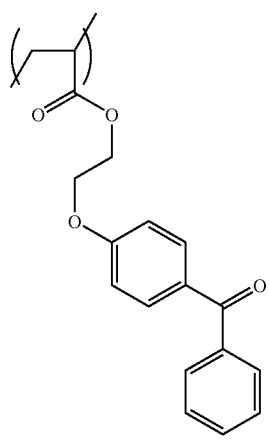

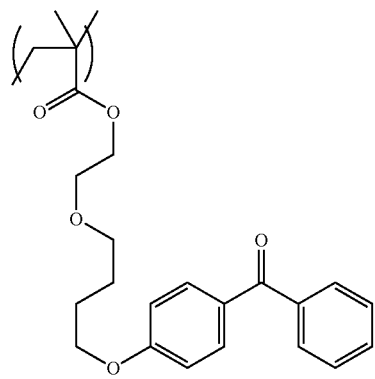

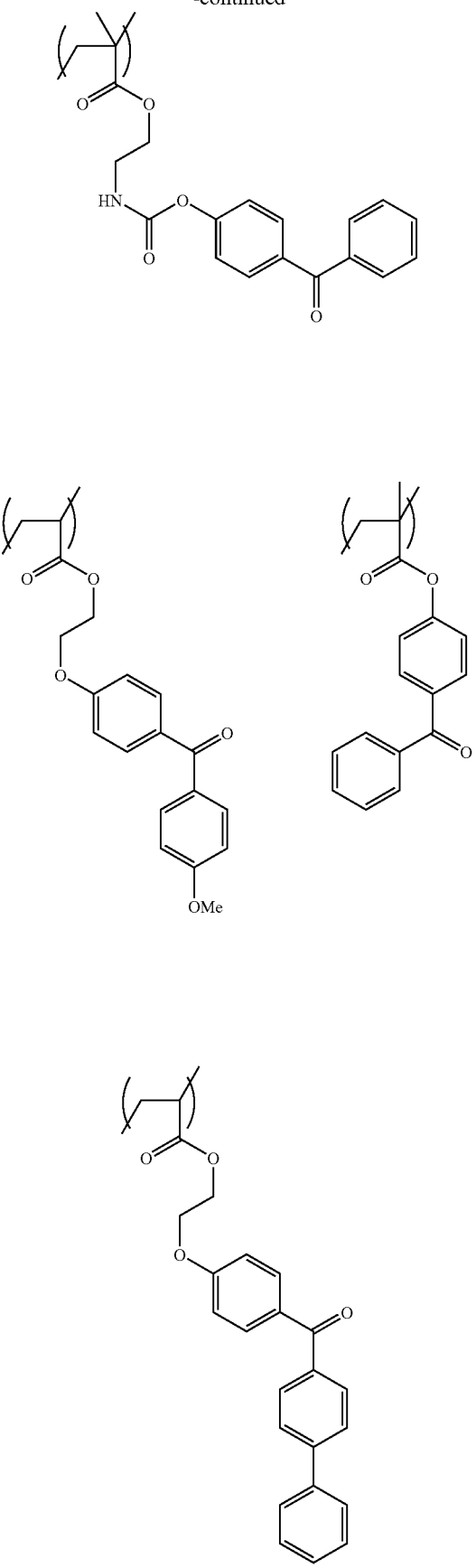

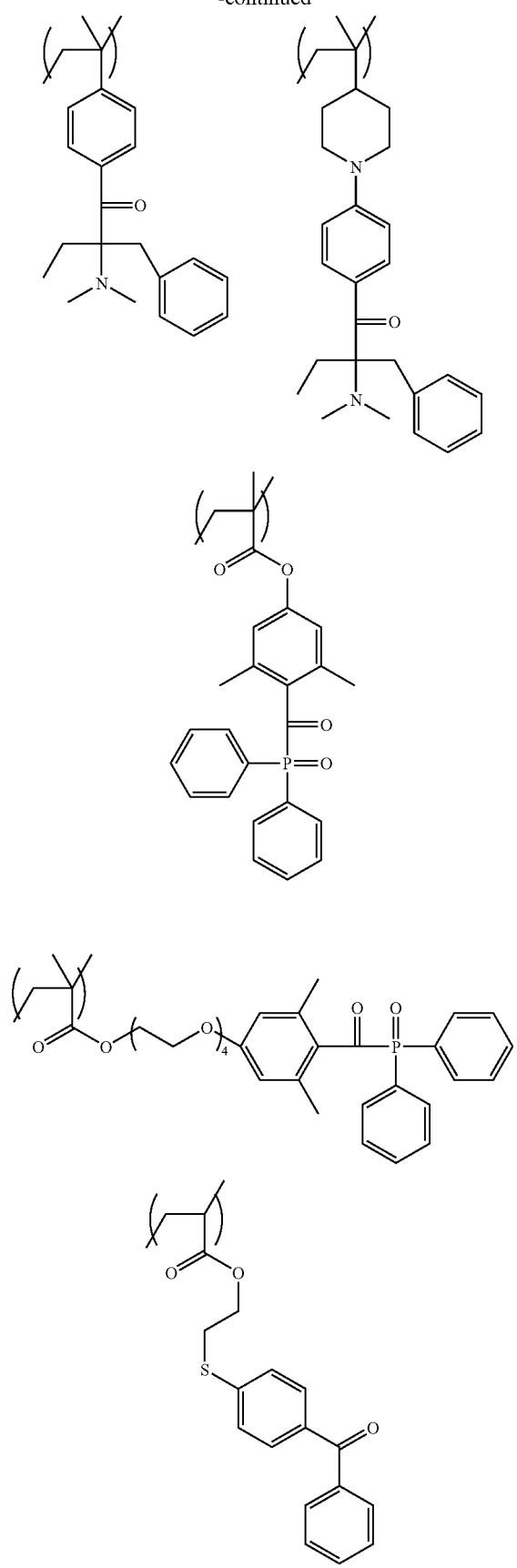
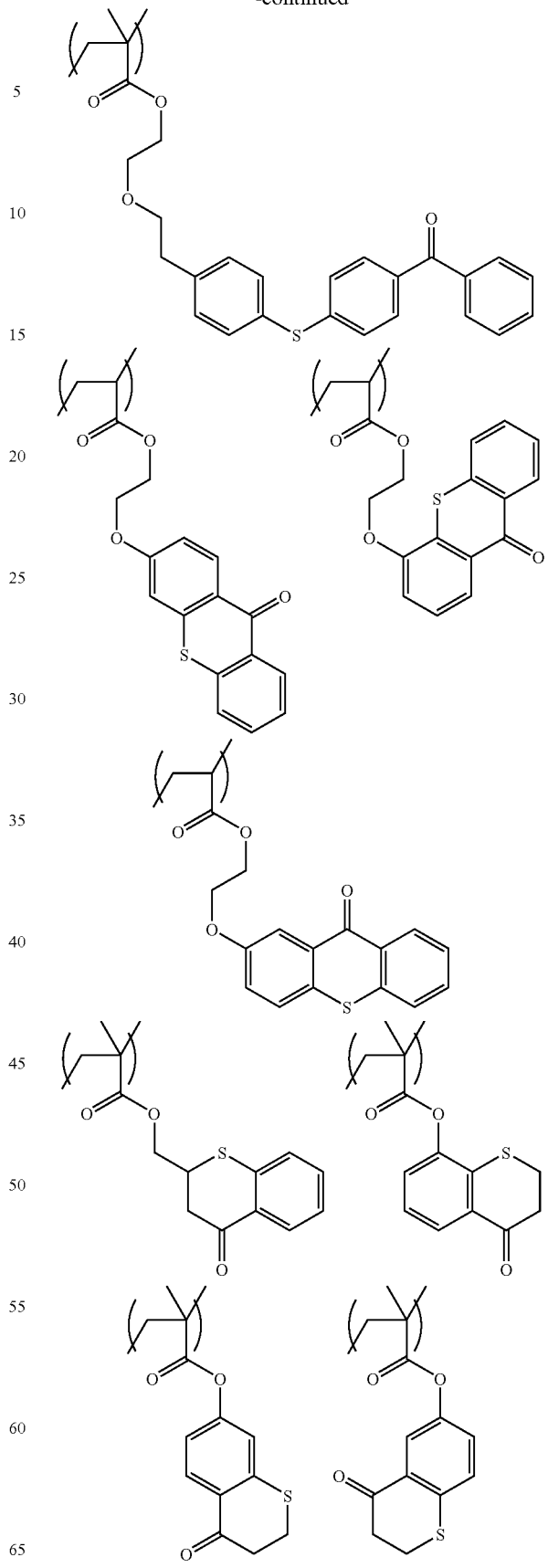

Hereinafter, the partial structure for introducing the photoradical generation site by polycondensation will be illustrated.

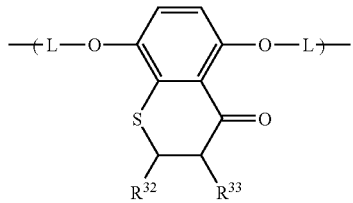

(a-1-8)

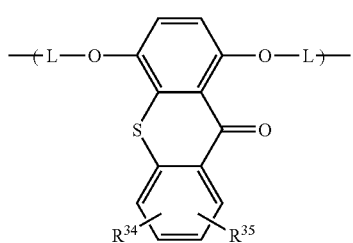

(a-1-9)

In the formulae (a-1-8) to (a-1-9), $R^{32}$, $R^{33}$, $R^{34}$ and $R^{35}$ each independently represent a hydrogen atom, a hydroxyl group, a halogen atom, or a linear or branched alkyl, alkenyl or alkynyl group having 1 to 20 carbon atoms, and the alkyl group may, in its alkyl chain, have non-consecutive oxygen atoms.

Preferable among them are a methyl group, an ethyl group, an isopropyl group, an isobutyl group, a 2-ethylhexyl group, a methoxy group, an ethoxy group, a chlorine atom, a bromine atom, an acryloyl group, and a methacryloyl group.

L is the same as in the formula (a-1-1), and preferable examples thereof are also the same as defined therein.

Hereinafter, specific examples of the structure unit for introducing the photoradical generation site by polycondensation are shown below, but the invention is not limited thereto.

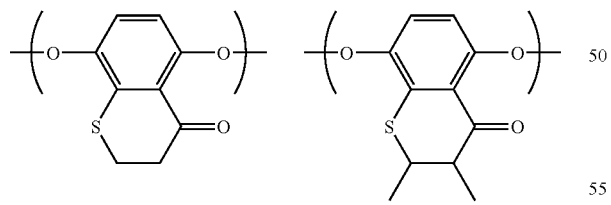

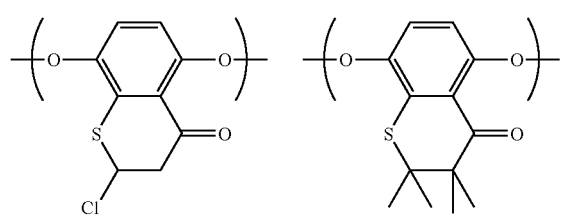

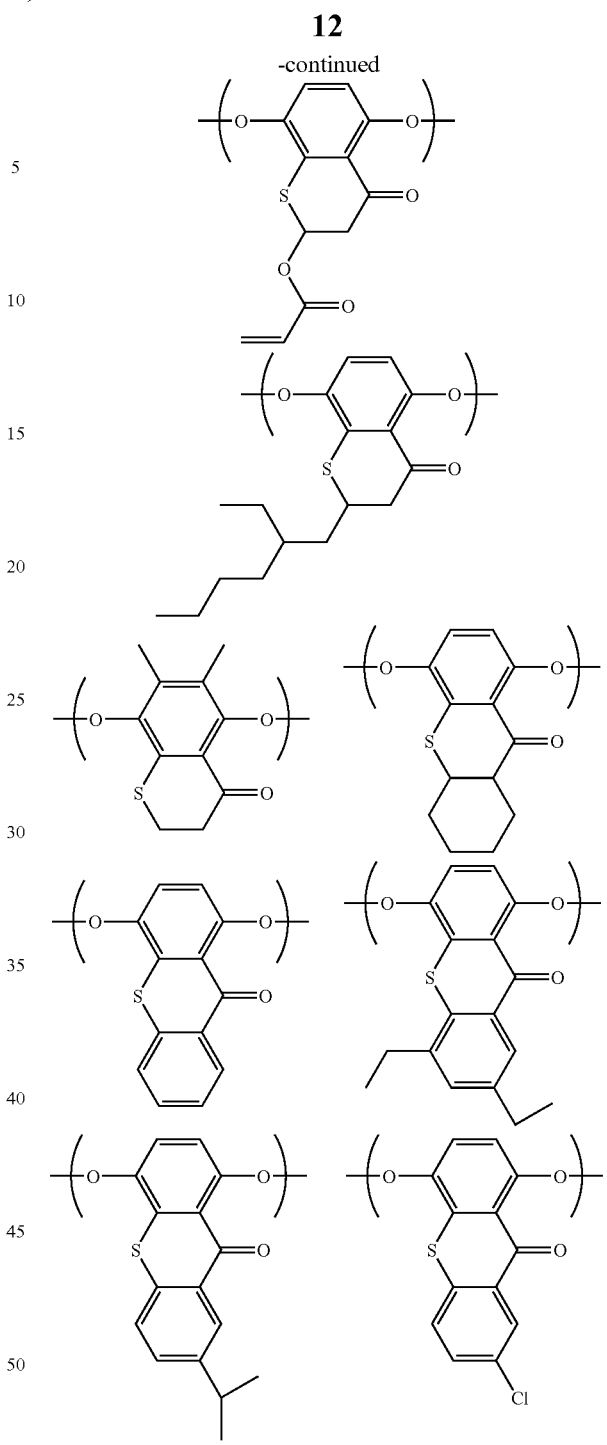

(A) The specific polymer in the invention may include only one kind of structure including (a-1) the photoradical generation site or two kinds or more structures thereof.

The content of (a-1) the photoradical generation site in (A) the specific polymer in the invention is preferably such that the structural units are contained in the range of 10 to 99% by weight, more preferably 50 to 99% by weight, from the viewpoint of blocking suppression and dissolution.

<(a-2) At Least One Segregation Site Selected from a Fluoroalkyl Group, a Siloxane Structure, and a Long-Chain Alkyl Group>

(A) The specific polymer in the invention has (a-2) at least one segregation site selected from a fluoroalkyl group, a siloxane structure, and a long-chain alkyl group (hereinafter referred to merely as segregation site).

Hereinafter, these partial structures will be described.

[(a-2-1) Fluoroalkyl Group]

The fluoroalkyl group in the specific polymer in the invention refers to a structure including an alkyl or alkylene group substituted with at least one fluorine atom. The fluoroalkyl group herein includes a fluoroalkyl group wherein at least one hydrogen atom in the alkyl or alkylene group has been replaced by a fluorine atom, and the fluoroalkyl group is preferably a perfluoroalkyl or perfluoroalkylene group having every hydrogen atom in the alkyl or alkylene group has been replaced by fluorine atoms, among them, a perfluoroalkyl group having every hydrogen atom in the alkyl group has been replaced is more preferable.

The alkyl group is one having preferably 3 to 12 carbon atoms, more preferably 4 to 10 carbon atoms, still more preferably 6 to 8 carbon atoms.

The alkylene group is one having preferably 2 to 12 carbon atoms, more preferably 4 to 10 carbon atoms, still more preferably 6 to 8 carbon atoms.

Specific aspects of the fluorine-substituted hydrocarbon groups in the invention will be described.

Preferable fluorine-substituted hydrocarbon groups possessed by the specific polymer include those represented by (a2-1) or (a2-2) shown below.

(a2-1) Substituent (hereinafter referred to sometimes as "fluoroaliphatic group") derived from a fluoroaliphatic compound produced by a telomerization or oligomerization method.

(a2-2) Substituent represented by the following (formula I):

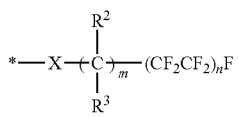

Formula I

In the above (formula I), $R^2$ and $R^3$ each independently represent a hydrogen atom or an alkyl group having 1 to 4 carbon atoms, X represents a covalent bond or a divalent linking group (organic group), m represents an integer of 0 or more, and n represents an integer of 1 or more.

When m is 2 or more, functional groups on mutually adjacent carbons (that is, $R^2$ and $R^3$ groups on mutually adjacent carbons) may be bound to each other to form an aliphatic ring.

The substituents represented by (formula I) are linked via the portion * to the polymer main chain.

(a2-1) Substituent Derived from a Fluoroaliphatic Compound Produced by a Telomerization or Oligomerization Method The fluorine-substituted alkyl group in the invention is preferably a substituent (fluoroaliphatic group) derived from a fluoroaliphatic compound produced by a telomerization method (also called a telomere method) or an oligomerization method (also called an oligomer method).

The method for production of such fluoroaliphatic group is described in, for example, "Synthesis and Functions of Fluorine Compounds", pp. 117-118, supervised by Nobuo Ishikawa and published by CMC, 1987, and "Chemistry of Organic Fluorine Compounds II", pp. 747-752, Monograph 187, Ed by Milos Hudlicky and Attila E. Ravlath, American Chemical Society 1995.

The telomerization method is a method wherein a telomere is synthesized by radical polymerization of a fluorine-containing vinyl compound such as tetrafluoroethylene, by using, as a telogen, an alkyl halide (for example an iodide) having a large chain transfer constant.

In the invention, the fluoroaliphatic compound synthesized by the telomere method is preferably a fluoroaliphatic compound represented by the formula [TM-1] below.

When such fluoroaliphatic compound is used as it is or after being converted into the desired monomer structure, the fluorine-substituted hydrocarbon groups can be introduced into the specific polymer in the invention.

[TM-1]

In the formula [TM-1], T represents one kind of group selected from the following (group T), Z is one kind of group selected from the following (group Z), and n represents an integer of 0 to 20.

The fluoroaliphatic compound represented by the formula [TM-1], when having a polymerizable group such as a double bond in Z, may be used as a copolymer component in synthesizing the specific polymer in the invention.

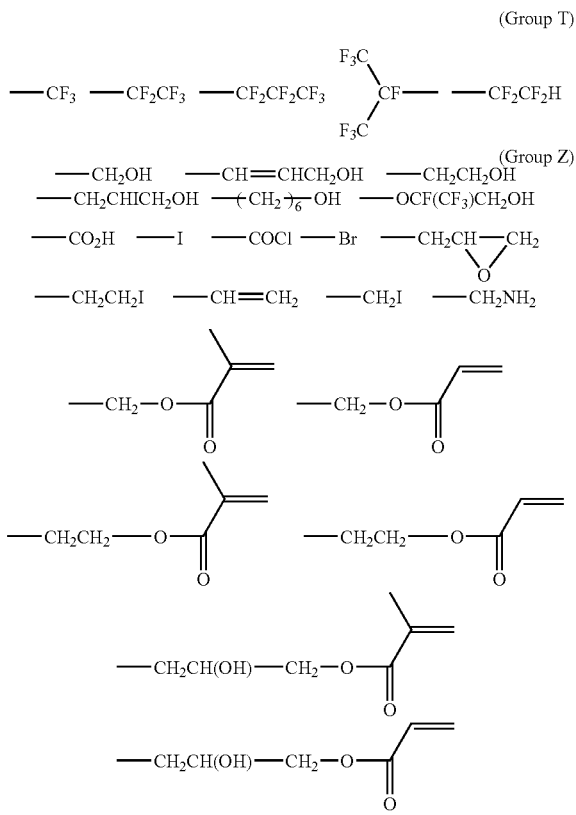

When the group represented by Z in the formula [TM-1] is one kind of group selected from the following (group Z'), the group comes to have a structure having an acryloyl or methacryloyl group in a molecular end. Accordingly, this is particularly preferable because the specific polymer in the invention can be obtained easily by vinyl polymerization from the fluoroaliphatic compound represented by the formula [TM-1].

(Group Z')

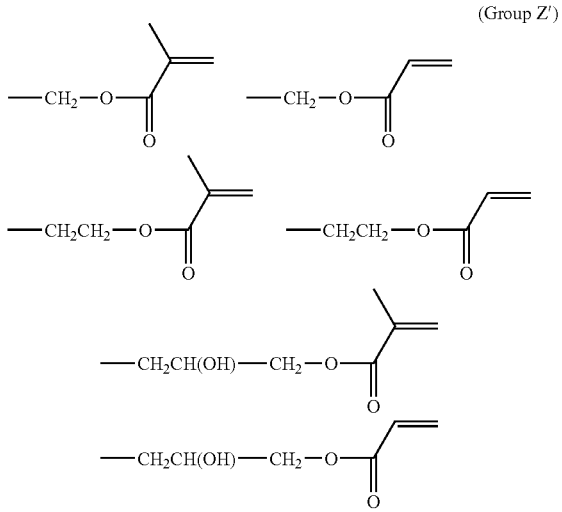

Specific examples of compounds produced by the telomere method (commercial products based on fluoroaliphatic compounds represented by the formula [TM-1]), used preferably in synthesizing the specific polymer in the invention, include for example fluorine-based chemical products available from Daikin Chemicals Sales Co., LTD. and CHEMINOX FA, FA-M, FAAC, FAAC-M, FAMAC and FAMAC-M manufactured by Nippon Mektron, Ltd.

The fluoroaliphatic compound produced by the telomere method can be used in easily synthesizing a polymer having a fluoroaliphatic group in a side chain, such as the specific polymer in the invention, by a method known to those skilled in the art.

The substituent derived from the fluoroaliphatic compound produced by the oligomerization method (oligomer method) is also preferable in the invention.

The oligomerization method is a method wherein tetrafluoroethylene is subjected to cationic polymerization with potassium fluoride or cesium fluoride as a catalyst, in a polar solvent such as diglyme, thereby producing the corresponding oligomer. As a specific example, Synthesis Example 3 below is shown.

The fluoroaliphatic compound obtained by the oligomer method, similar to the compound obtained by the telomere method, is subjected to cationic polymerization to give an oligomer having polymerizable groups (unsaturated bonds), which are then utilized if necessary with suitable chemical modifications, whereby a polymer having, in a side chain, a substituent (fluorine-containing hydrocarbon group) derived from the fluoroaliphatic compound can be systhesized.

Synthesis Example 3

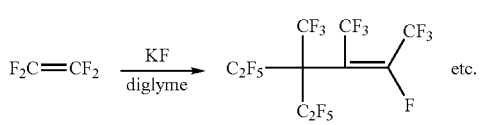

(a2-2) Substituent Represented by (Formula I)

From the viewpoint of uneven distribution in the ink surface, the specific polymer in the invention preferably has substituents represented by the following (formula I):

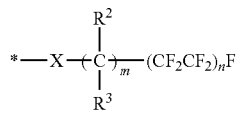

Formula I

In the above (formula I), $R^2$ and $R^3$ each independently represent a hydrogen atom or an alkyl group having 1 to 4 carbon atoms, * represents a linking site to the polymer chain, X represents a covalent bond or a divalent linking group, m represents an integer of 0 or more, and n represents an integer of 1 or more.

When m is 2 or more, functional groups on mutually adjacent carbons (that is, $R^2$ and $R^3$ groups on mutually adjacent carbons) may be bound to each other to form an aliphatic ring.

In the substituent represented by the above (formula I), "n" in (formula I) is preferably 1 to 10, more preferably 1 to 4, even more preferably 2 or 3.

That is, the specific polymer in the invention is preferable because the structure of the side-chain portion bound to the polymer main chain is a structure represented by the following (formula IB) wherein n is particularly 2, 3 or 4 thereby exhibiting extremely performance.

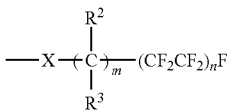

Formula IB

In the above (formula IB), $R^2$, $R^3$, X, m and n each have the same meanings as defined in $R^2$, $R^3$, X, m and n in (formula I), respectively.

The alkyl group having 1 to 4 carbon atoms represented by each of $R^2$ and $R^3$ in (formula I) and (formula IB) includes a methyl group, an ethyl group, a propyl group, an isopropyl group, an n-butyl group, an isobutyl group, and a tert-butyl group, and is preferably a hydrogen atom or a methyl group, more preferably a hydrogen atom.

In (formula I) and (formula IB), it is meant that when X is a covalent bond, the polymer main chain, and the carbon atom through which $R^2$ and $R^3$ are bound, are directly bound to each other.

When X is a divalent linking group, the linking group includes —O—, —S—, —N($R^4$)—, —CO—. Among them, —O— is more preferable.

$R^4$ represents a hydrogen atom or an alkyl group having 1 to 4 carbon atoms. The alkyl group includes a methyl group, an ethyl group, a propyl group, an isopropyl group, an n-butyl group, an isobutyl group and a tert-butyl group, among which a hydrogen atom or a methyl group is preferable.

In (formula I) and (formula IB), m represents an integer of 0 or more, preferably an integer of 2 to 8, particularly preferably 2. When m is 2 or more, functional groups on mutually adjacent carbons (that is, $R^2$ and $R^3$ groups on mutually adjacent carbons) may be bound to each other to form an aliphatic ring.

In (formula I) and (formula IB), n represents an integer of 1 or more, preferably an integer of 1 to 10, more preferably 1 to 4, even more preferably 2 or 3.

In (formula I), * represents a linking site to the polymer main chain, and there are the following examples in the specific mode of the polymer main chain.

Examples include acrylic resin, methacrylic resin, styryl resin, polyester resin, polyurethane resin, polycarbonate resin, polyamide resin, polyacetal resin, phenol/formaldehyde condensed resin, polyvinyl phenol resin, maleic anhydride/α-olefin resin, and α-hetero-substituted methacrylic resin. Among them, acrylic resin, methacrylic resin, styryl resin, polyester resin and polyurethane resin are preferable among which acrylic resin, methacrylic resin and polyurethane resin are particularly useful.

1) Specific polymer having a fluorine-substituted hydrocarbon group in the invention can be obtained easily by methods known to those skilled in the art, such as condensation polymerization, addition polymerization or ring-opening polymerization, by suitably selecting (A) the monomer having a fluoroaliphatic group and (B) the monomer having a substituent represented by the above (formula I) (that is, the monomer having a fluorine-substituted hydrocarbon group). If necessary, these monomers can be mixed to produce the polymer.

(Monomer Having a Fluorine-Substituted Hydrocarbon Group)

In the invention the specific polymer is obtained preferably by using the monomer having a fluorine-substituted hydrocarbon group (hereinafter referred to as the fluorine-substituted hydrocarbon group-containing monomer).

The fluorine-substituted hydrocarbon group-containing monomer preferably includes monomers represented by the following (formula (II)):

Formula II $$H_2C=C(R^1)-C(=O)-X-(C(R^2)(R^3))_m-(CF_2CF_2)_nF$$

In (formula II), $R^1$ represents a hydrogen atom, a halogen atom, a methyl group which may have a substituent or an ethyl group which may have a substituent. $R^2$, $R^3$, X, m and n have the same meanings as defined in $R^2$, $R^3$, X, m and n in (formula I), respectively, and preferable examples thereof are also the same as defied therein.

The halogen atom represented by $R^1$ in (formula II) includes, for example, a fluorine atom, a chlorine atom and a bromine atom.

Hereinafter, specific examples of the monomers represented by the above (formula II) used in the invention will be illustrated.

Specific examples wherein n=4

(F-1) $CH_2=CH-C(=O)-O-CH_2CH_2-(CF_2CF_2)_4F$ (F-2) $CH_2=C(CH_3)-C(=O)-O-CH_2CH_2-(CF_2CF_2)_4F$ (F-3) $CH_2=C(CH_3)-C(=O)-S-CH_2CH_2-(CF_2CF_2)_4F$ (F-4) $CH_2=C(CH_3)-C(=O)-NH-CH_2CH_2-(CF_2CF_2)_4F$ (F-5) $CH_2=CH-C(=O)-N(CH_3)-CH_2CH_2-(CF_2CF_2)_4F$ (F-6) $CH_2=C(C_2H_5)-C(=O)-N(C_4H_9)-CH_2CH_2-(CF_2CF_2)_4F$ (F-7) $CH_2=C(Cl)-C(=O)-O-CH_2CH_2-(CF_2CF_2)_4F$ (F-8) $CH_2=CH-C(=O)-O-CH_2-(CF_2CF_2)_4F$ (F-9) $CH_2=CH-C(=O)-O-CH_2CH_2CH_2CH_2-(CF_2CF_2)_4F$ (F-10) $CH_2=C(CH_3)-C(=O)-O-CH_2CH_2CH_2CH_2-(CF_2CF_2)_4F$ (F-11) $CH_2=CH-C(=O)-O-C(CH_3)_2-CH-(CF_2CF_2)_4F$ (with CH$_3$ groups on central carbon)

(F-12) $CH_2=CH-C(=O)-O-CH(CH_3)-(CF_2CF_2)_4F$

Specific examples wherein n=3

(F-13) CH₂=CH−C(=O)−O−CH₂CH₂−(CF₂CF₂)₃F (F-14) CH₂=C(CH₃)−C(=O)−O−CH₂CH₂−(CF₂CF₂)₃F (F-15) CH₂=C(CH₃)−C(=O)−S−CH₂CH₂−(CF₂CF₂)₃F (F-16) CH₂=C(CH₃)−C(=O)−NH−CH₂CH₂−(CF₂CF₂)₃F (F-17) CH₂=CH−C(=O)−N(CH₃)−CH₂CH₂−(CF₂CF₂)₃F (F-18) CH₂=C(C₂H₅)−C(=O)−N(C₄H₉)−CH₂CH₂−(CF₂CF₂)₃F (F-19) CH₂=C(Cl)−C(=O)−O−CH₂CH₂−(CF₂CF₂)₃F (F-20) CH₂=CH−C(=O)−O−CH₂−(CF₂CF₂)₃F (F-21) CH₂=CH−C(=O)−O−CH₂CH₂CH₂CH₂−(CF₂CF₂)₃F (F-22) CH₂=C(CH₃)−C(=O)−O−CH₂CH₂CH₂CH₂−(CF₂CF₂)₃F (F-23) CH₂=CH−C(=O)−O−CH(CH₃)−CH(CH₃)−(CF₂CF₂)₃F (F-24) CH₂=CH−C(=O)−O−CH(CH₃)−(CF₂CF₂)₃F

Specific examples wherein n=1

(F-25) CH₂=CH−C(=O)−O−CH₂CH₂−CF₂CF₃

(F-26) CH₂=C(CH₃)−C(=O)−O−CH₂CH₂−CF₂CF₃

(F-27) CH₂=C(CH₃)−C(=O)−S−CH₂CH₂−CF₂CF₃

(F-28) CH₂=C(CH₃)−C(=O)−NH−CH₂CH₂−CF₂CF₃

(F-29) CH₂=CH−C(=O)−N(CH₃)−CH₂CH₂−CF₂CF₃

(F-30) CH₂=C(C₂H₅)−C(=O)−N(C₄H₉)−CH₂CH₂−CF₂CF₃

(F-31) CH₂=C(Cl)−C(=O)−O−CH₂CH₂−CF₂CF₃

(F-32) CH₂=CH−C(=O)−O−CH₂−CF₂CF₃

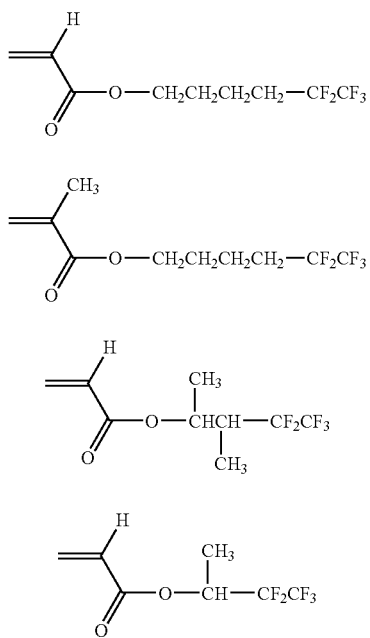

Specific examples wherein n=2

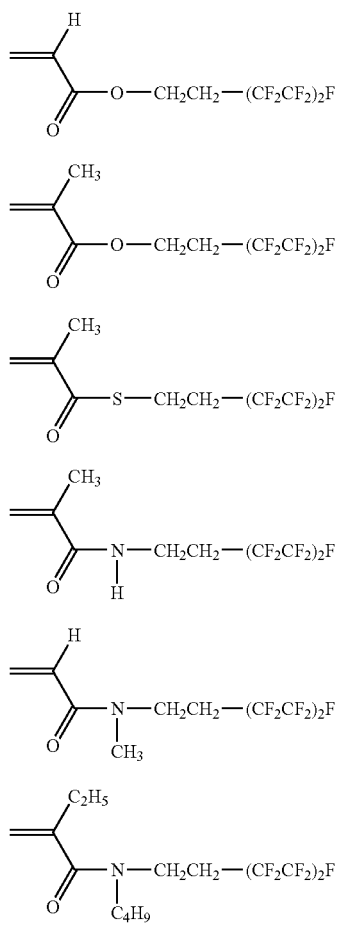

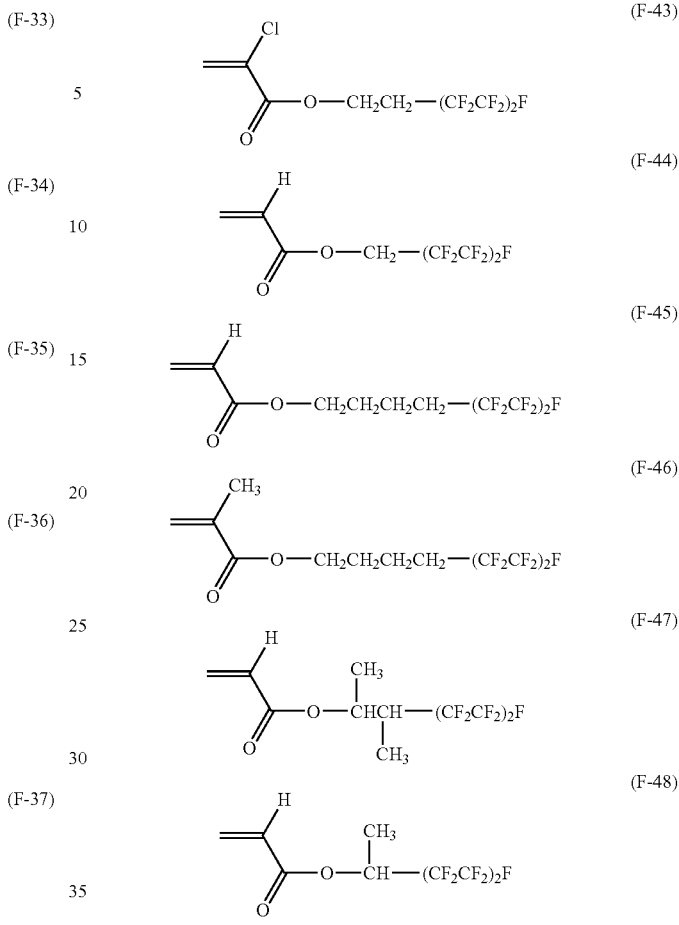

The monomers used in synthesis of the specific polymer in the invention are those monomers of the above (formula II) wherein "n" is preferably 1 to 10, more preferably 1 to 4, still more preferably 2 or 3, among the monomers represented by the above (formula II).

As a diol used in forming the urethane structure described above, a diol having a fluoroalkyl group can be used to introduce a fluoroalkyl group into (A) the specific polymer. The diol having a fluoroalkyl group can be obtained by treating a fluoroalkyl group having an epoxy group at the terminal thereof with an acid catalyst according to a method described in JP-A No. 2005-126357. By this method, for example, fluoroalkyl 1,2-diol can be obtained with high yield.

For introduction of a fluoroalkyl group into (A) the specific polymer, a compound including a fluoroalkyl group having an epoxy group may be used. The fluoroalkyl compound having an epoxy group is available as a commercial product, and examples include E-1430, E-1630, E-1830, E-2030, E-5244, E-5444, E-5644, E-5844, and E-7432 manufactured by Daikin Industries, Ltd.

[(a-2-2) Siloxane Structure]

The siloxane structure included in (A) the specific polymer in the invention is not particularly limited as long as it has, as a partial structure, a siloxane skeleton represented by "—Si—O—Si—".

In the invention, the specific polymer having a siloxane structure is preferably a compound constituted to include a structural unit having a siloxane structure in a side chain, from the viewpoint of increasing the jetting stability of an ink composition and of increasing surface segmentation upon formation of the ink composition into a coating film.

The siloxane compound useful in introducing the siloxane structure intramolecularly into (A) the specific polymer is available as a commercial product and includes, for example, one-terminal-reactive silicones such as X-22-173DX and X-22-173BX manufactured by Shin-Etsu Chemical Co., Ltd.

The siloxane skeleton can also be synthesized by reacting a siloxane having a reactive terminal, with a compound having a cationic polymerizable group. The siloxane skeleton may be synthesized for example from a compound having a one-terminal hydroxyl group (for example, Silaplane series FM-0411, FM-0421 and FM-0425 manufactured by Chisso Corp.) and epichlorohydrin or by synthesis in accordance with a method described in JP-A No. 11-80315.

The siloxane skeleton in the invention includes, but is not limited to, the following structures.

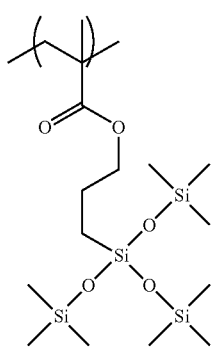

(a2-7)

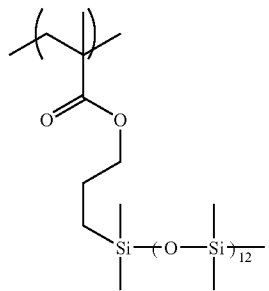

(a2-8)

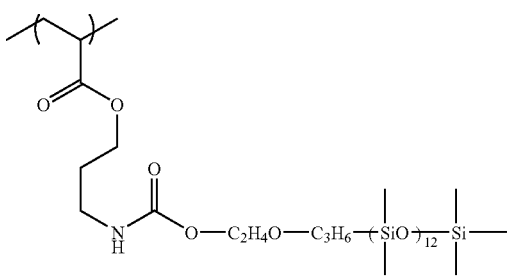

(a2-9)

[(a-2-3) Long-Chain Alkyl Group]

<Alkyl Group Having 6 or More Carbon Atoms>

The alkyl group having segregation property, which constitutes the segregation site in the invention, is not particularly limited as long as it is an alkyl group having 6 or more carbon atoms, and the alkyl group may be linear, branched or cyclic but is preferably linear. The number of carbon atoms in the group is 6 to 40, more preferably 6 to 18, even more preferably 6 to 12.

The alkyl group having 6 or more carbon atoms, which is present in the side chain in (A) the specific polymer contained in the ink composition of the invention, is a substituent represented by —$C_nH_{2n+1}$ in formula (III) below, and preferably includes the structural unit represented by the formula (III), thereby being introduced into the polymer.

(III)

In the formula (III), n represents an integer of 6 to 40, preferably 6 to 18, even more preferably 6 to 12, from the viewpoint of segregation property.

Y represents a polymer main chain, and —$C_nH_{2n+1}$ (an alkyl group having 6 or more carbon atoms) is bound directly or via a binding group to this main chain.

W represents a single bond or a linking group, and when W represents a single bond, the long-chain alkyl group is bound directly to the polymer main chain. $Z^1$ represents a hydrogen atom or a monovalent substituent.

The 6 or more alkyl groups in the formula (III) may be present plurally in the structure unit, and in this case, use can be made to the aspect wherein an alkyl group having 6 or more carbon atoms is bound via the linking group W to the position $Z^1$ or to the aspect wherein the linking group W has a branched structure or a cyclic structure, and any of carbon atoms constituting W may be connected via its end to another alkyl group having 6 or more carbon atoms.

The above-mentioned W includes a linear, branched, chained or cyclic alkylene having 1 to 20 carbons, a liner, branched or cyclic alkenylene having 2 to 20 carbons, an alkynyl group having 2 to 20 carbon atoms, an arylene (monocycle, heterocycle) having 6 to 20 carbon atoms, —OC(=O)—, —OC(=O)Ar—, —OC(=O)O—, —OC(=O)OAr—, —C(=O)NR—, —C(=O)NAr—, —SO₂NR—, —SO₂NAr—, —O— (alkyleneoxy, polyalkyleneoxy), —OAr— (aryleneoxy, polyaryleneoxy), —C(=O)O—, —C(=O)O—Ar—, —C(=O)Ar—, —C(=O)—, —SO₂O—, —SO₂OAr—, —OSO₂—, —OSO₂Ar—, —NRSO₂—, —NArSO₂—, NRC(=O)—, —NArC(=O)—, —NRC(=O)O—, —NArC(=O)O—, —OC(=O)NR— —OC(=O)NAr—, —NAr—, —NR—, —N+RR'—, —N+RAr—, —N+ArAr'—, —S—, —SAr—, —ArS—, a heterocyclic group (for example, a 3- to 12-membered monocycle or condensed ring including one or more nitrogen, oxygen or sulfur as a heteroatom), —OC(=S)—, —OC(=S)Ar—, —C(=S)O—, —C(=S)OAr—, —C(=S)OAr—, —C(=O)S—, —C(=O)SAr—, —ArC(=O)—, —ArC(=O)NR—, —ArC(=O)NAr—, —ArC(=O)O—, —ArC(=O)O—, —ArC(=O)S—, —ArC(=S)O—, —ArO— and —ArNR—.

R and R' each represent a hydrogen atom, a liner or branched alkyl group, a linear or cyclic alkyl group, a linear or branched alkenyl group, a linear or cyclic alkenyl group, a linear or branched alkynyl group, or a linear or cyclic alkynyl group, and Ar and Ar' each represent an aryl group.

Among these linking groups, an arylene (monocycle, heterocycle) having 6 to 20 carbon atoms, —C(=O)NR—, —C(=O)NAr—, —O— (alkyleneoxy, polyalkyleneoxy), —OAr— (aryleneoxy, polyaryleneoxy), —C(=O)O—, —C(=O)O—Ar—, —C(=O)—, —C(=O)Ar—, —S—, —SAr—, —ArS—, —ArC(=O)—, —ArC(=O)O—, —ArC(=O)O—, —ArO—, and —ArNR— are preferable, and an arylene (monocycle, heterocycle) having 6 to 20 carbon atoms, —C(=O)NR—, —O(=O)NAr—, —O— (alkyleneoxy, polyalkyleneoxy), —OAr— (aryleneoxy, polyaryleneoxy), —C(=O)O—, —C(=O)O—Ar—, —SAr—, —ArS—, —ArC(=O)—, —ArC(=O)O—, —ArC(=O)O—, —ArO—, and —ArNR— are more preferable.

In the invention, the linking group represented by W may be a combination of two or more linking groups mentioned herein.

Hereinafter, the divalent substituent represented by W includes particularly preferable examples form the viewpoint of segregation on ink surface, but the invention is not particularly limited thereto.

W:

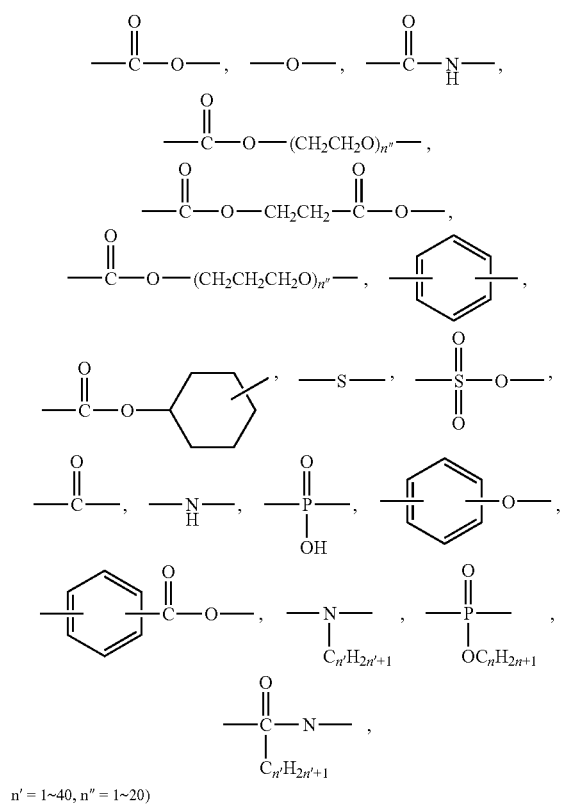

$Z^1$ includes not only the aspect wherein a long-chain alkyl group is bound via the linking group W, but also groups shown below. When m is 6 or more to 20 or less, $Z^1$ can have a long-chain alkyl group in such an aspect.

Hereinafter, specific examples of the structural unit having a long-chain alkyl group in the invention are shown below, but the invention is not limited thereto.

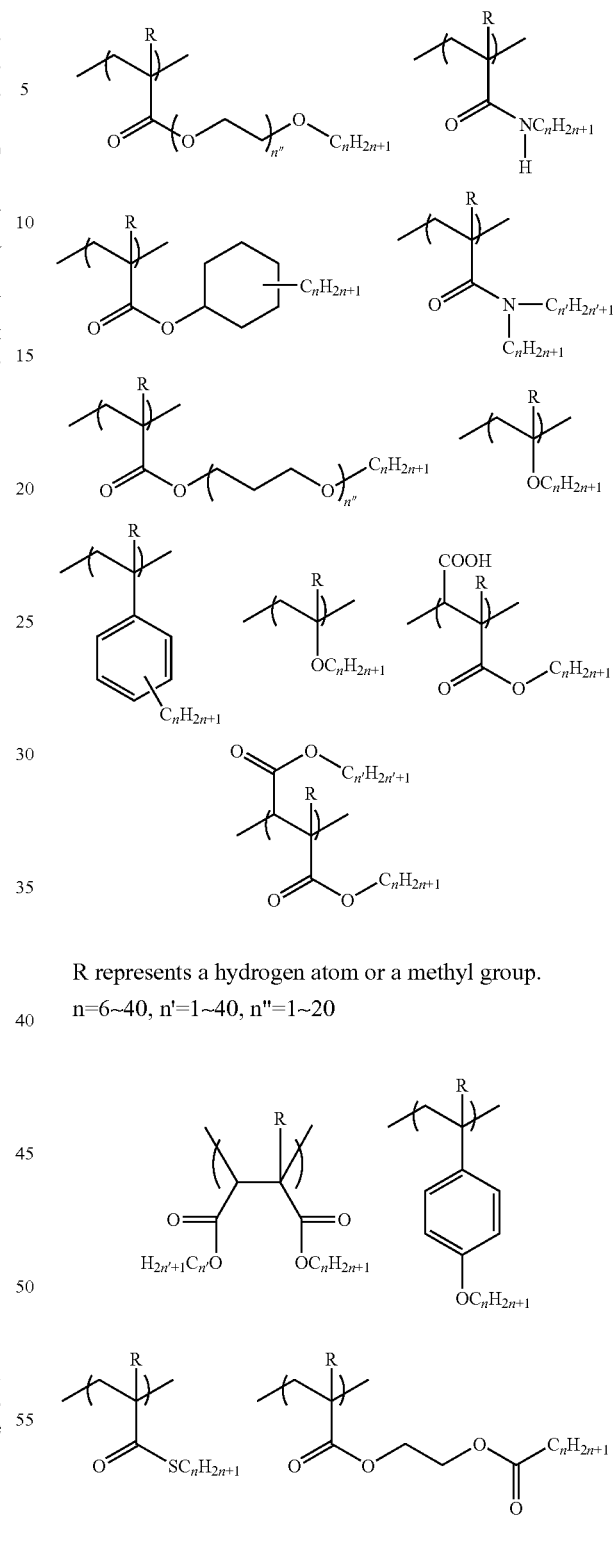

R represents a hydrogen atom or a methyl group.
n=6~40, n'=1~40, n"=1~20

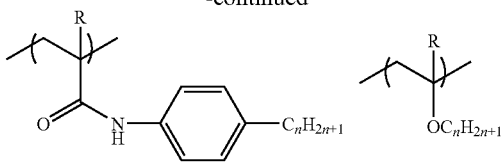

R represents a hydrogen atom or a methyl group.
n=6~40, n'=1~40

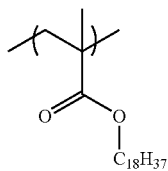

a2-10

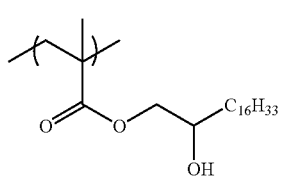

a2-11

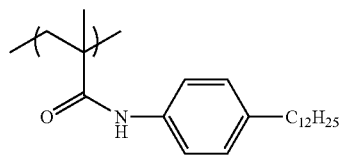

a2-12

The content of the partial structure selected from the group consisting of (a-2-1) fluoroalkyl group, (a-2-2) siloxane skeleton and (a-2-3) long-chain alkyl group, in (A) the specific polymer in the invention, is preferably 0.3 to 40% by weight, more preferably 0.5 to 30% by weight, even more preferably 1 to 20% by weight, based on the weight of the specific polymer.

With this ratio, the specific polymer can be effectively surface-segregated in the ink composition.

<(a-3) Radical Polymerization Group>

The specific polymer in the invention preferably has (3) the radical-polymerizable group in a side chain.

When the specific polymer contains the radical-polymerizable group, the ink composition improves curability, inhibits surface tackiness, and further improves blocking properties.

The radical-polymerizable group includes polymerizable groups having a radical-polymerizable ethylenically unsaturated bond.

Examples of the polymerizable group having a radical-polymerizable ethylenically unsaturated bond include unsaturated carbonate groups such as an acrylate group, a methacrylate group, an itaconate group, a crotonate group, an isocrotonate group and a maleate group, as well as radical-polymerizable groups such as a styrene group. Among them, a methacrylate group and an acrylate group are preferable.

The content of the radical-polymerizable group in the specific polymer is preferably 0 to 80 mol %, more preferably 10 to 60 mol %, more preferably 30 to 60 mol %.

The method of introducing the radical-polymerizable group into the specific polymer includes a method wherein a monomer having a radical-polymerizable group double bond sealed by reaction with a protective group is used and this monomer is copolymerized to eliminate the protective group thereby forming a radical-polymerizable group (double bond) or a method wherein a low-molecular-weight compound having a radical-polymerizable group is introduced by polymerization reaction into the specific polymer.

Hereinafter, specific examples of (a-3) the radical-polymerizable group will be described. However, the invention will not be limited to these examples.

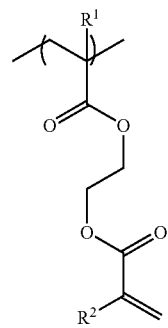

$R^1$ = H, $R^2$ = H (a3-1)
$R^1$ = H, $R^2$ = CH$_3$ (a3-2)
$R^1$ = CH$_3$, $R^2$ = H (a3-3)
$R^1$ = CH$_3$, $R^2$ = CH$_3$ (a3-4)

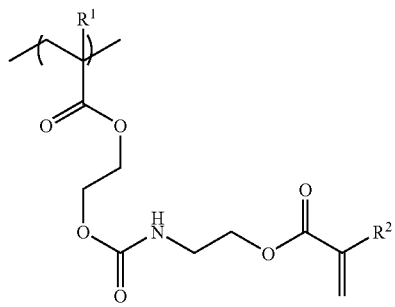

$R^1$ = H, $R^2$ = H (a3-5)
$R^1$ = H, $R^2$ = CH$_3$ (a3-6)
$R^1$ = CH$_3$, $R^2$ = H (a3-7)
$R^1$ = CH$_3$, $R^2$ = CH$_3$ (a3-8)

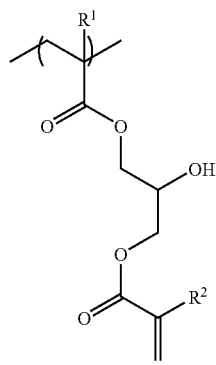

$R^1$ = H, $R^2$ = H (a3-9)
$R^1$ = H, $R^2$ = CH$_3$ (a3-10)
$R^1$ = CH$_3$, $R^2$ = H (a3-11)
$R^1$ = CH$_3$, $R^2$ = CH$_3$ (a3-12)

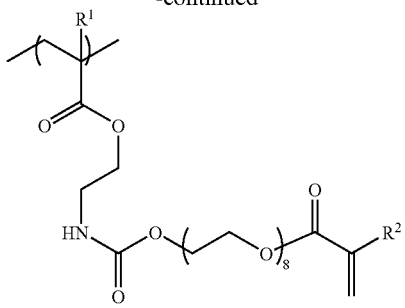

R¹ = H, R² = H (a3-13)
R¹ = H, R² = CH₃ (a3-14)
R¹ = CH₃, R² = H (a3-15)
R¹ = CH₃, R² = CH₃ (a3-16)

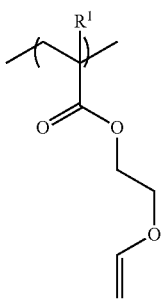

R¹ = H (a3-17)
R¹ = H (a3-18)

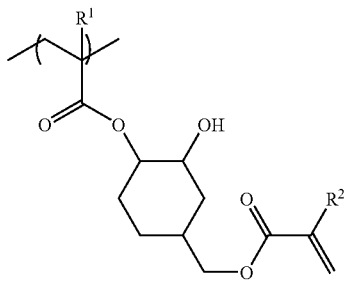

R¹ = H, R² = H (a3-19)
R¹ = H, R² = CH₃ (a3-20)
R¹ = CH₃, R² = H (a3-21)
R¹ = CH₃, R² = CH₃ (a3-22)

The specific polymer in the invention essentially has (a-1) photoradical polymerization site and (a-2) surface segregation site selected from the group consisting of (a-2-1) fluoroalkyl group, (a-2-2) siloxane skeleton and (a-2-3) long-chain alkyl group and further preferably includes (a-3) radical-polymerizable group, and may further include copolymerizable components (other copolymerizable components) having other structures. The other copolymerizable compounds are preferably used in the specific polymer, from the viewpoint of improvement in insolubility in the ink composition and of improvement in blocking property by regulation of polymer Tg.

The main structure of the specific polymer contained in the ink composition of the invention is not particularly limited, and may be a methacrylic resin or an acrylic resin and may be the main chain structure composed of a urethane bond or a urea bond.

(Other Copolymerizable Components)

The other copolymerizable components that constitute (A) the specific polymer in the invention include not only general monomers for solubility, Tg, and regulation, but also a monomer having an amine group as a intramolecular hydrogen donor, a monomer having a Si—H group and a monomer having a radical-polymerizable precursor, and is used preferably in combination with monomers capable of formation, by polymerization reaction after copolymerization, into a polymer having radical-polymerizable groups.

The other structural units include, for example, the following compounds.

Examples include molecular two-terminal diol type alkylene oxides such as ethylene glycol and propylene glycol, tertiary amine group-containing diols, and ethylene oxide-modified polycaprolactam.

By adding these copolymerizable components, the Tg of the whole polymer is preferably made room temperature or more.

The content of other copolymerizable components in the specific polymer is preferably in the range of 0 to 50% by weight, more preferably 0 to 30% by weight, most preferably 0 to 20% by weight.

Hereinafter, specific examples [specific polymers (a-1) to (a-23)] of (A) the specific polymer of the invention will be illustrated by clearly specifying their structural units, polymerization molar ratios and weight average molecular weights (Mw), but the invention is not limited thereto.

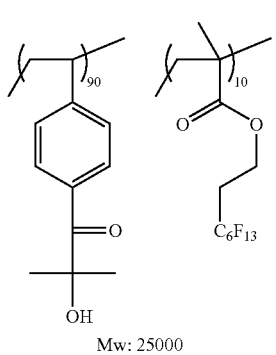

(a-1)

Mw: 25000

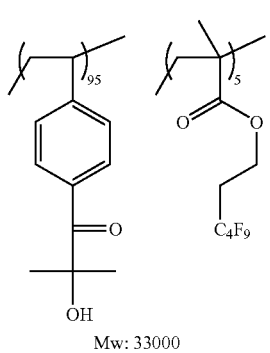

(a-2)

Mw: 33000

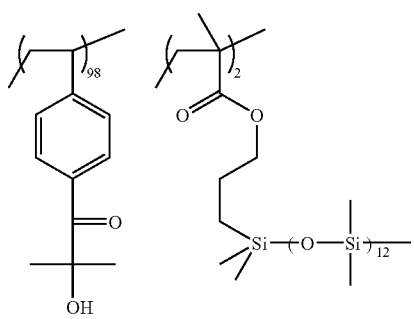
(a-3)
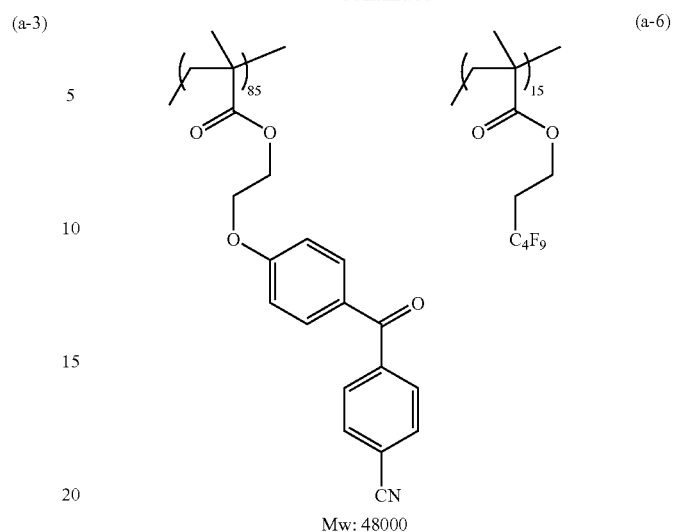
(a-6)
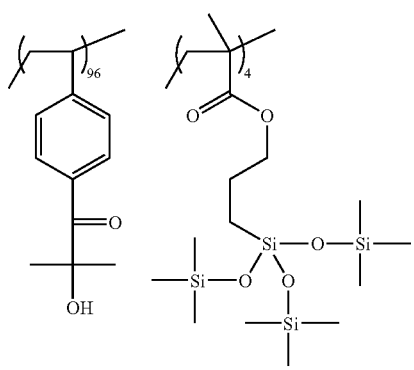
(a-4)
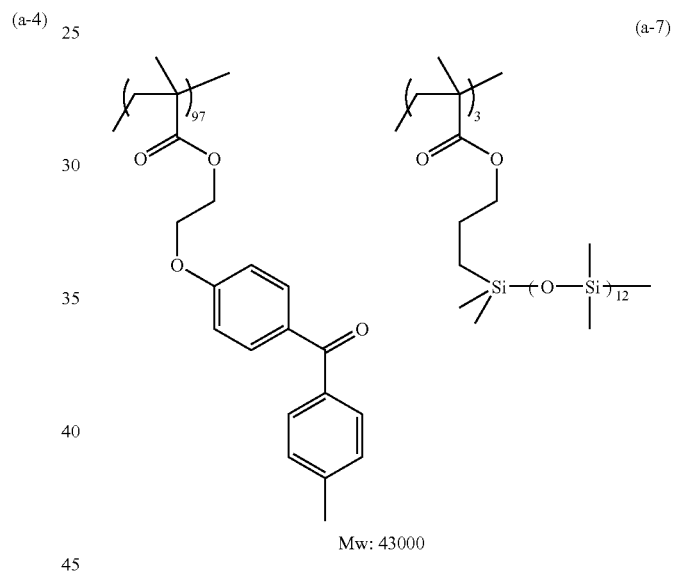
(a-7)
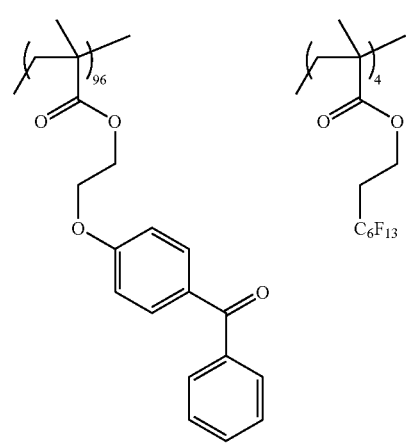
(a-5)
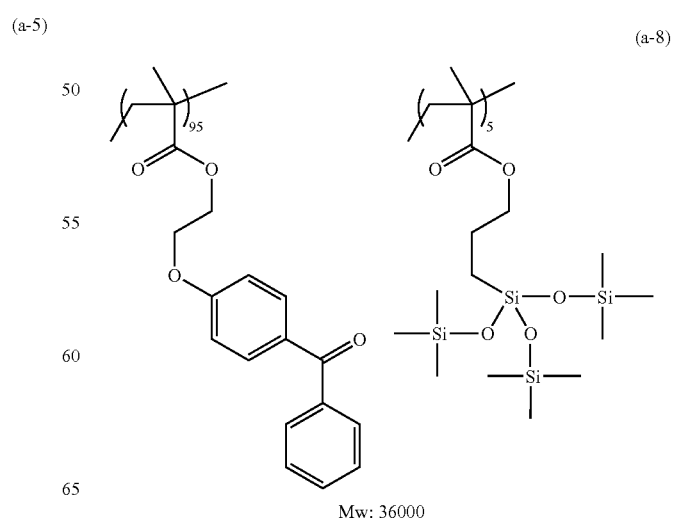
(a-8)

(a-9)
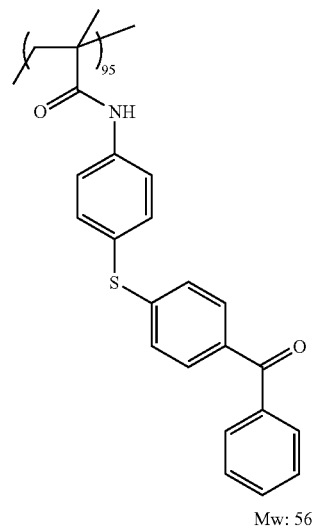
Mw: 56000
(a-10)
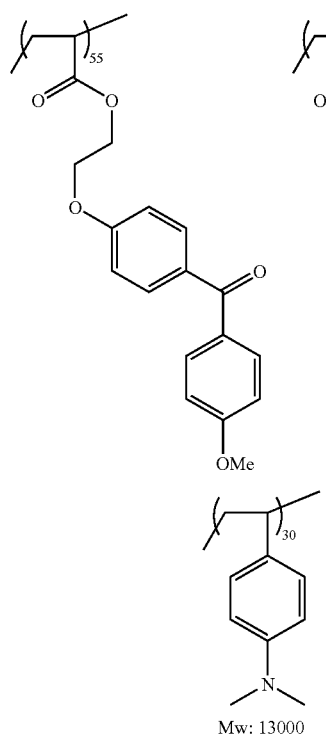
Mw: 13000
(a-11)
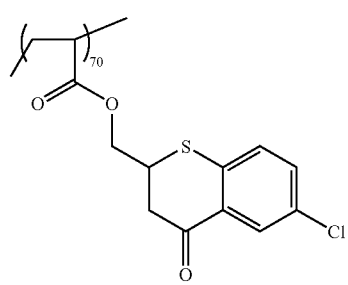
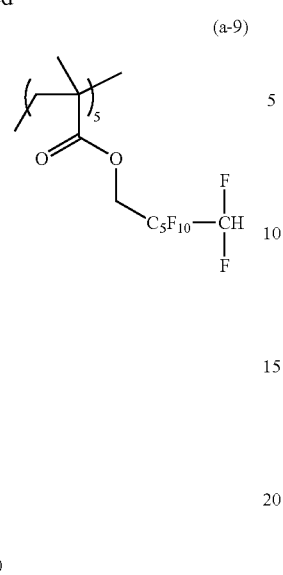
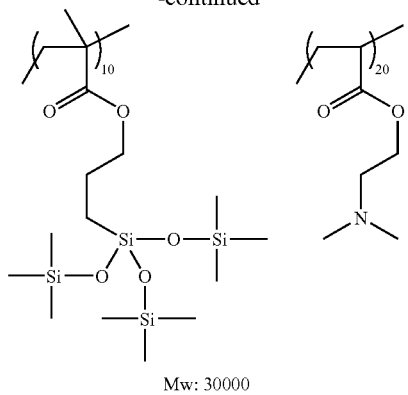
Mw: 30000
(a-12)
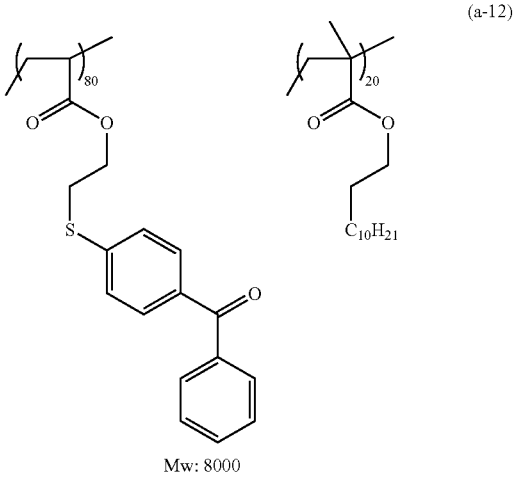
Mw: 8000
(a-13)
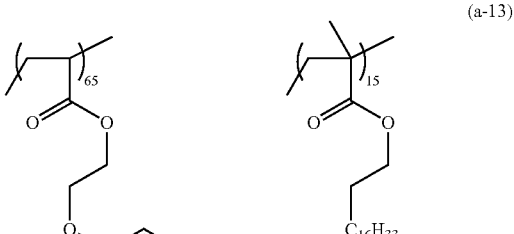
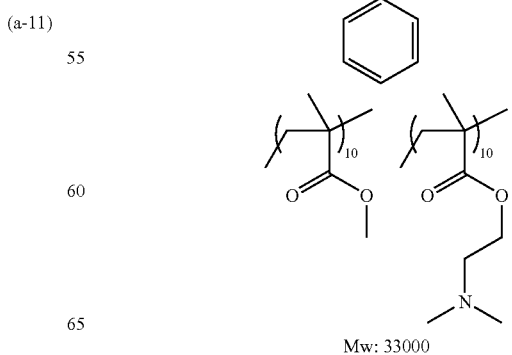
Mw: 33000

(a-14)
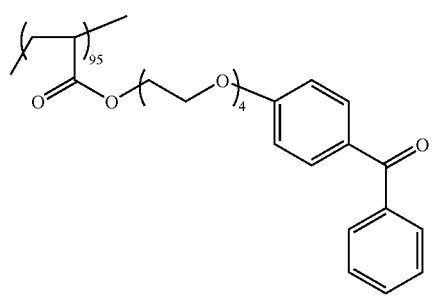
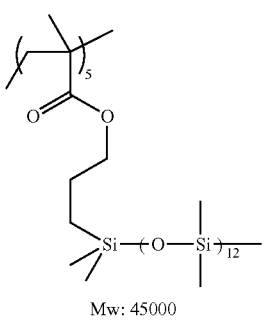
Mw: 45000
(a-15)
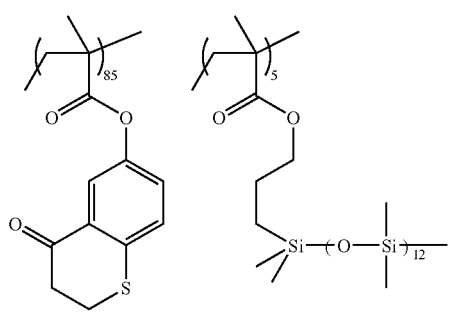
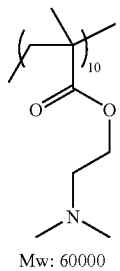
Mw: 60000
(a-16)
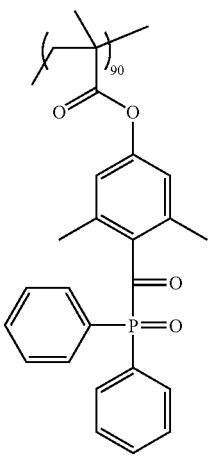
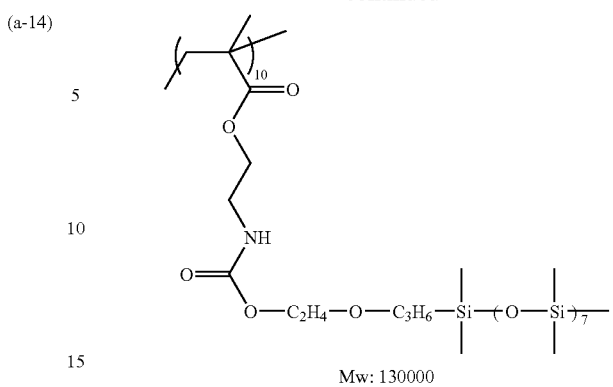
Mw: 130000
(a-17)
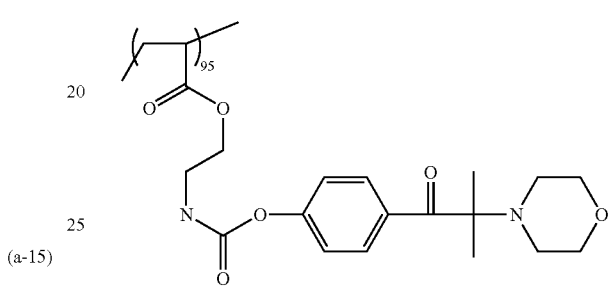
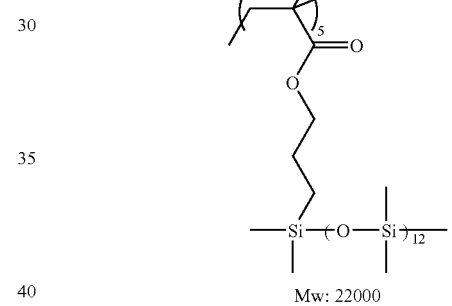
Mw: 22000
(a-18)
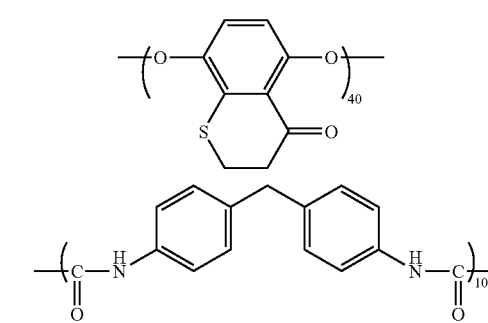
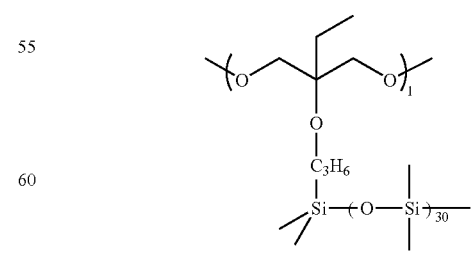

-continued
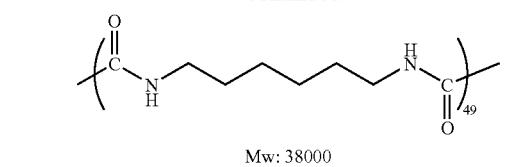
Mw: 38000
(a-19)
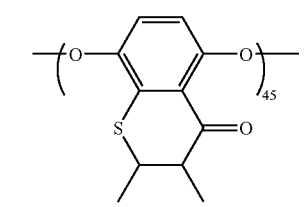
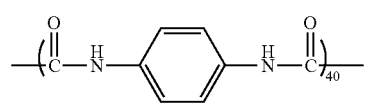
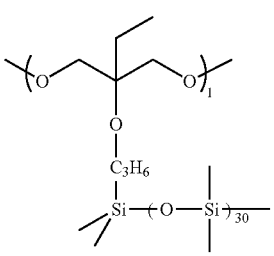
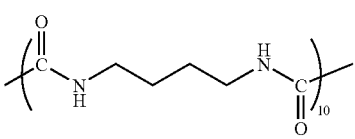 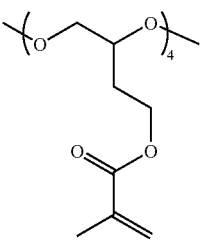
Mw: 36000
(a-20)
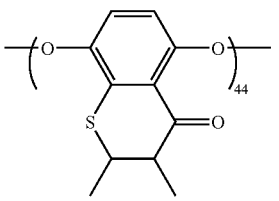
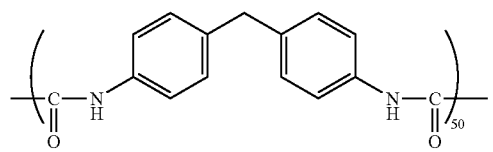
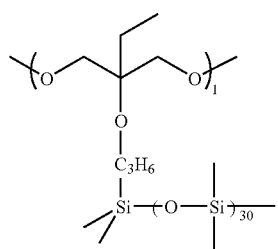
Mw: 38000
-continued
(a-21)
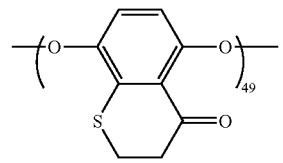
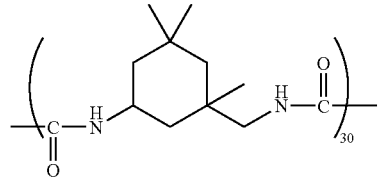
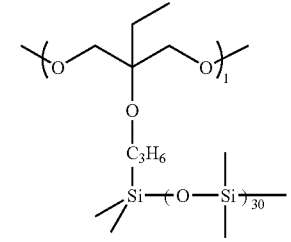
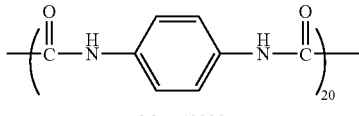
Mw: 40000
(a-22)
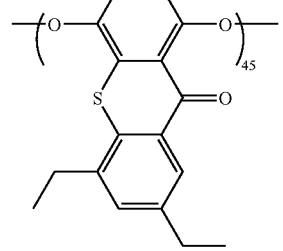
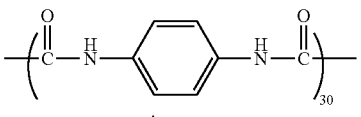
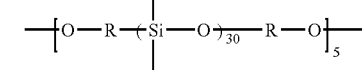
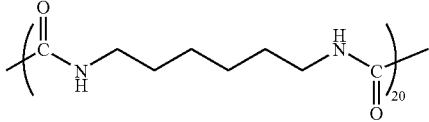
Mw: 46000
(a-23)
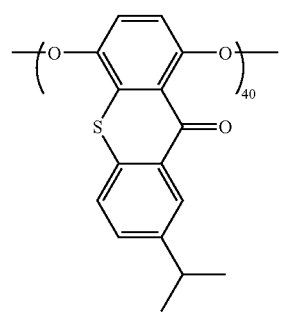

-continued

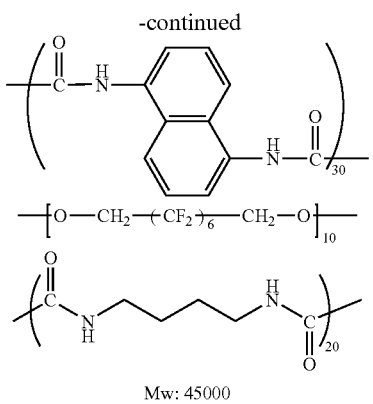

Mw: 45000

The molecular weight of (A) the specific polymer, in terms of weight-average molecular weight determined by GPC, is preferably 5000 to 100000, more preferably 8000 to 100000, most preferably 10000 to 100000.

When the specific polymer itself has adhesiveness upon aggregation thereon, its inhibitory effect on blocking will not brought about. Accordingly, the polymer should have a molecular weight enough to exhibit a physical property for showing a certain glass transition temperature, specifically a Tg of 20° C. or more. When the weight-average molecular weight is smaller than the above range, low-molecular oligomer components having a molecular weight of 1000 or less is increased in the molecular-weight distribution, and thus the inhibitory effect on blocking may not be sufficiently brought about.

That is, (A) the specific polymer selected in the invention is preferably one having a glass transition temperature (Tg) of 20 or more to 180° C. or less, more preferably 20 or more to 100° C. or less. The Tg used in the invention is a value measured at an increasing temperature rate of 10° C./min with a differential scanning calorimeter (DSC).

The Tg of (A) the specific polymer can be regulated not only by regulating the molecular weight, but also for example by introducing structural units such as methyl methacrylate, isobornyl methacrylate, FA-513A and bisphenol A and then regulating the amounts of the structural units introduced.

The content of the specific polymer on a weight basis is preferably 0.2 to 10% by weight, more preferably 0.2 to 8% by weight, still more preferably 0.2 to 5% by weight, relative to the total solids of the ink composition in the invention. When the content is in this range, the inkjet ink can improve surface hardness and blocking suppression without exerting adverse influence on the necessary physical properties.

[(B) Radical-Polymerizable Compound]

The ink composition of the invention contains (B) the radical-polymerizable compound.

(B) The radical-polymerizable compound is a compound having a radical-polymerizable ethylenically unsaturated bond, and may be any compound having at least one radical-polymerizable ethylenically unsaturated bond in a molecule, and examples thereof include those having a chemical configuration such as a monomer, an oligomer, or a polymer. One type of radical-polymerizable compound may be used, or two or more types thereof may be used at an arbitrary ratio in order to improve an intended property. It is preferable to use two or more types of compounds in combination, from the viewpoint of regulating performances such as reactivity and physical properties.

Examples of the polymerizable compound having a radical-polymerizable ethylenically unsaturated bond include unsaturated carboxylic acids such as acrylic acid, methacrylic acid, itaconic acid, crotonoic acid, isocrotonoic acid, and maleic acid, and salts thereof, anhydrides having an ethylenically unsaturated group, acrylonitrile, styrene, and various types of radical-polymerizable compounds such as unsaturated polyesters, unsaturated polyethers, unsaturated polyamides, and unsaturated urethanes.

Specific examples thereof include acrylic acid derivatives such as 2-ethylhexyl acrylate, 2-hydroxyethyl acrylate, butoxyethyl acrylate, carbitol acrylate, cyclohexyl acrylate, tetrahydrofurfuryl acrylate, benzyl acrylate, bis(4-acryloxypolyethoxyphenyl)propane, neopentylglycol diacrylate, 1,6-hexanediol diacrylate, ethylene glycol diacrylate, diethylene glycol diacrylate, triethylene glycol diacrylate, tetraethylene glycol diacrylate, polyethylene glycol diacrylate, polypropylene glycol diacrylate, pentaerythritol triacrylate, pentaerythritol tetraacrylate, dipentaerythritol tetraacrylate, trimethylolpropane triacrylate, tetramethylolmethane tetraacrylate, oligoester acrylate, N-methylol acrylamide, diacetone acrylamide, and epoxyacrylate; methacrylic derivatives such as methyl methacrylate, n-butyl methacrylate, 2-ethylhexyl methacrylate, lauryl methacrylate, allyl methacrylate, glycidyl methacrylate, benzyl methacrylate, dimethylaminomethyl methacrylate, 1,6-hexanediol dimethacrylate, ethylene glycol dimethacrylate, triethylene glycol dimethacrylate, polyethylene glycol dimethacrylate, polypropylene glycol dimethacrylate, trimethylolethane trimethacrylate, trimethylolpropane trimethacrylate, and 2,2-bis(4-methacryloxypolyethoxyphenyl)propane; and allyl compound derivatives such as allyl glycidyl ether, diallyl phthalate, and triallyl trimellitate. More specifically, commercial products, radical-polymerizable or crosslinking monomers, oligomers, and polymers known in the art such as those described in "Crosslinking Agent Handbook", Ed. S. Yamashita (Taiseisha, 1981); "UV-EB Curing Handbook (Starting Materials)" Ed. K. Kato (Kobunshi Kankoukai, 1985); "Application and Market of UV-EB Curing Technology", p. 79, Ed. Rad Tech (CMC, 1989); and E. Takiyama "Polyester Resin Handbook" (The Nikkan Kogyo Shimbun Ltd., 1988) can be used.

Furthermore, as the radical-polymerizable compounds, photo-curable polymerization materials that are used in photo-polymerizable compositions described in, for instance, JP-A No. 7-159983, JP-B No. 7-31399, JP-A Nos. 8-224982, 10-863 and 9-134011 are known and these can be applied as well in the ink composition of the invention.

Furthermore, as the radical-polymerizable compound, vinyl ether compounds can be preferably used. Examples of preferably usable vinyl ether compounds include di- or tri-vinyl ether compounds such as ethylene glycol divinyl ether, ethylene glycol monovinyl ether, diethylene glycol divinyl ether, triethylene glycol monovinyl ether, triethylene glycol divinyl ether, propylene glycol divinyl ether, dipropylene glycol divinyl ether, butane diol divinyl ether, hexane diol divinyl ether, cyclohexane dimethanol divinyl ether, hydroxyethyl monovinyl ether, hydroxynonyl monovinyl ether and trimethylolpropane trivinyl ether; and monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexane dimethanol monovinyl ether, n-propyl vinyl ether, isopropyl vinyl ether, isopropenyl ether-o-propylene carbonate, dodecylvinyl ether, diethylene glycol monovinyl ether and octadecyl vinyl ether.

Of the vinyl ether compounds, the di- or tri-vinyl ether compounds are preferred and divinyl ether compounds are particularly preferred from the viewpoint of curability, adhesiveness and surface hardness. The vinyl ether compounds can be used singularly or in a combination of two or more appropriate kinds.

In the total solid content of the ink composition of the invention, the content of (B) the radical-polymerizable compound is preferably 55 to 90% by weight, more preferably 60 to 85% by weight, based on the total amount of the ink composition. Given this ratio given, coating films excellent in curability and color reproduction can be obtained.

For improving the flexibility of the coating film, the content of monofunctional monomers in the radical-polymerizable compound is preferably 60 to 100% by weight, more preferably 80 to 100% by weight, even more preferably 90 to 100% by weight.

[(C) Photoradical Generator Different from (A) the Specific Polymer]

The ink composition of the invention contains (C) photoradical generator different from (A) the specific polymer. As (C) the photoradical generator different from (A) the specific polymer, a known photopolymerization initiator can be appropriately selected in accordance with the type of the simultaneously used components that are (A) the specific polymer and the polymerizable compound (B), as well as the intended object of the ink composition.

(C) The photopolymerization initiator used in the ink composition of the invention is a compound that absorbs an external energy (light) to generate a radical as a photopolymerization initiator. The light can be exemplified by active radiations, that is, γ-rays, β-rays, electron beam, UV-rays, visible rays and IR-rays.

(C) The photoradical generator (photoradical initiator) may be a known compound. The photopolymerization initiator that is preferably usable in the invention includes (a) aromatic ketones, (b) acylphosphine oxide compounds, (c) aromatic onium salt compounds, (d) organic peroxides, (e) thio compounds, (f) hexaarylbiimidazole compounds, (g) ketooxime ester compounds, (h) borate compounds, (i) azinium compounds, (j) metallocene compounds, (k) active ester compounds, (l) compounds having a carbon halogen bond and (m) alkylamine compounds.

The radical polymerization initiator may be a single compound or a combination of compounds selected from the above-mentioned (a) to (m). The radical polymerization initiators in the invention may be used singularly or in a combination of two or more kinds.

Preferable examples of (a) aromatic ketones, (b) acylphosphine compounds and (e) thio compounds include compounds each having a benzophenone skeleton or a thioxanthone skeleton disclosed in J. P. Fouassier and J. F. Rabek, RADIATION CURING IN POLYMER SCIENCE AND TECHNOLOGY, pp. 77-117, 1993. More preferable examples include α-thiobenzophenone compounds disclosed in JP-B No. 47-6416, benzoin ether compounds disclosed in JP-B No. 47-3981, α-substituted benzoin compounds disclosed in JP-B No. 47-22326, benzoin derivatives disclosed in JP-B No. 47-23664, aroyl phosphonate esters disclosed in JP-A No. 57-30704, dialkoxybenzophenone disclosed in JP-B No. 60-26483, benzoin ethers disclosed in JP-B No. 60-26403, JP-A No. 62-81345, α-aminobenzophenones disclosed in JP-B No. 1-34242, U.S. Pat. No. 4,318,791 and European Patent No. 0284561, p-di(dimethylaminobenzoyl) benzene disclosed in JP-A No. 2-211452, thio-substituted aromatic ketones disclosed in JP-A No. 61-194062, acylphosphine sulfides disclosed in JP-B No. 2-9597, acylphosphines disclosed in JP-B No. 2-9596, thioxanthones disclosed in JP-B No. 63-61950, and coumarins disclosed in JP-B No. 59-42864.

Among them, the acylphosphine oxide compounds are preferably used as the polymerization initiator in the invention, and bis(2,4,6-trimethylbenzoyl)-phenylphosphineoxide (trade name: IRGACURE 819, manufactured by Ciba Specialty Chemicals), bis(2,6-dimethoxybenzoyl)-2,4,4-trimethyl-pentylphenylphosphineoxide, 2,4,6-trimethylbenzoyl-diphenyl-phosphineoxide (DAROCUR TPO manufactured by Ciba Specialty Chemicals, LUCIRIN TPO manufactured by BASF) are particularly preferably used.

(C) The photoradical generators can be used alone or as a mixture of two or more thereof.

(C) The content of the photoradical initiator in the ink composition is preferably in the range of 0.1 to 20% by weight, more preferably 0.5 to 10% by weight, even more preferably 1 to 7% by weight, in terms of solids content based on the ink composition.

<Other Additives>

The inkjet recording ink composition of the invention may contain other components simultaneously for the purpose of improvement in physical properties in addition to the essential components as long as the effect of the invention is not impaired.

Hereinafter, these arbitrary components will be described.

The ink composition of the invention may further contain, as co-sensitizers, known components having actions such as further improvement in sensitivity or suppression of the polymerization inhibition with oxygen.

Examples of the co-sensitizer include amines such as those described in "Journal of Polymer Society" written by M. R, Sander et al., vol. 10, p. 3173 (1972), JP-B No. 44-20189, JP-A Nos. 51-82102, 52-134692, 59-138205, 60-84305, 62-18537, and 64-33104 and Research Disclosure 33825. Specific examples thereof include triethanolamine, ethyl p-dimethylaminobenzoate, p-formyldimethylaniline, and p-methylthiodimethylaniline.

Other examples of the co-sensitizer includes thiols and sulfides, for example thiol compounds described in JP-A No. 53-702, JP-B No. 55-500806, and JP-A No. 5-142772, and disulfide compounds described in JP-A No. 56-75643. Specific examples thereof include 2-mercaptobenzothiazole, 2-mercaptobenzoxazole, 2-mercaptobenzimidazole, 2-mercapto-4(3H)-quinazoline, and β-mercaptonaphthalene.

Other examples of the co-sensitizer include amino acid compounds (e.g., N-phenylglycine), organic metal compounds described in JP-B No. 48-42965 (e.g., tributyltin acetate), hydrogen donors described in JP-B No. 55-34414, sulfur compounds described in JP-A No. 06-308727 (e.g., trithiane), and phosphorus compounds described in JP-A No. 06-250387 (e.g., diethyl phosphite).

The amount of the co-sensitizer added is suitably selected depending on the intended object and is generally 0.01 to 10% by weight based on the total amount (total mass) of the ink composition.

<Surfactant>

The ink composition of the invention preferably contains known surfactants. The known surfactants include those described in JP-A Nos. 62-173463 and 62-183457. In place of the known surfactant, an organofluoro compound may be used. The organofluoro compound is preferably hydrophobic. Examples of the organofluoro compound include a fluorine-containing surfactant, an oily fluorine-base compound (for example, fluorine oil) and a solid fluorine compound resin (for example, ethylene tetrafluoride resin). The organofluoro compound is described in JP-B 57-9053 (columns 8 to 17) and JP-A 62-135826.

(Colorant)

The ink composition of the invention can contain a colorant as necessary. By adding a colorant to the ink composition, the ink composition can form a visible image (colored image).

The colorant that can be used in the ink composition of the invention is not particularly limited, and can appropriately select and use a wide variety of known colorants (pigments, dyes) depending on intended purposes. For example when images excellent in weatherability are to be formed, pigments are preferable. As dyes, both water-soluble dyes and oil-soluble dyes may be used, among which the oil-soluble dyes are preferable.

(1. Pigment)

First, a pigment used preferably as the colorant in the ink composition of the invention will be described in detail. When the pigment is used as a colorant, a colored image formed with the ink composition is made excellent in light resistance.

The pigment is not particularly limited, and all generally commercial organic or inorganic pigments, pigments dispersed in an insoluble resin as a dispersant, and pigments having a surface grafted with a resin may be used. In addition, resin particles dyed with a dye may also be used.

Examples of these pigments include pigments described in "Ganryo no Jiten" "Dictionary of Pigments" Ed. by Seijirou Ito (2000), W. Herbst, K. Hunger "Industrial Organic Pigments", JP-A Nos 2002-12607, 2002-188025, 2003-26978, and 2003-342503.

Specific examples of the inorganic or organic pigments that can be used in the invention include compounds shown in paragraph numbers [0126] to [0131] in JP-A No. 2008-13646, and these can be used in the invention as well.

For dispersion of the pigment, for example, a dispersing machine such as a ball mill, a sand mill, an attritor, a roll mill, a jet mill, a homogenizer, a paint shaker, a kneader, an agitator, a henschel mixer, a colloidal mill, an ultrasonic homogenizer, a pearl mill, or a wet type jet mill may be used.

To carry out dispersion of the pigment, a dispersant may be added. Examples of the dispersant include hydroxyl group-containing carboxylic acid esters, salts of a long-chain polyaminoamide and a high molecular weight acid ester, high molecular weight polycarboxylic acid salts, high molecular weight unsaturated acid esters, high molecular weight copolymers, modified polyacrylates, aliphatic polycarboxylic acids, naphthalenesulfonic acid formaldehyde condensates, polyoxyethylene alkylphosphate esters, and pigment derivatives. It is also preferable to use a commercial polymeric dispersant such as SOLSPERSE series manufactured by Lubrizol Corporation.

Furthermore, as a dispersion adjuvant, a synergist, depending on the various types of pigment can be used. The dispersant and dispersion adjuvant are preferably added in an amount of 1 to 50 parts by weight relative to 100 parts by weight of the pigment.

In the ink composition, a solvent may be added as a dispersing medium for various components such as the pigment, or the polymerizable compound that is a solvent-free low-molecular-weight component may be added as a dispersing medium. The ink composition of the invention is a radiation curing type ink, and the ink is cured after application onto a recording medium, it is preferable not to use a solvent. This is because, if a solvent remains in the cured ink image, the solvent resistance is degraded and the VOC (Volatile Organic Compound) problem of the residual solvent occurs. From this viewpoint, the polymerizable compound is preferably used as the dispersion medium, and selection of a cation polymerizable monomer lowest in viscosity among them is preferable for improvement in dispersibility and handleability of the ink composition.

The volume-average particle size of the pigment particles in the ink composition is preferably in the range of 0.02 to 0.60 µm, more preferably 0.02 to 0.10 µm. The maximum particle size is preferably 3 µm or less, more preferably 1 µm or less, for the range of which the pigment, dispersant and dispersion medium are selected and dispersion conditions and filtering conditions are established. When the particle size is thus managed, a head nozzle can be inhibited from clogging, and the storage stability of ink, the transparency of ink and the curing sensitivity of ink can be maintained.

(2. Dye)

Then, the dye used preferably as the colorant in the invention will be described.

Conventionally known compounds (dyes) can be suitably selected and used as the dye. Specifically, compounds described in paragraph numbers [0023] to [0089] in JP-A No. 2002-114930 and in paragraph numbers [0136] to [0140] in JP-A No. 2008-13646 can be mentioned and used in the invention.

These colorant are added in an amount of 0.05 to 20% by weight, more preferably 0.2 to 10% by weight, based on the total amount (total mass) of the ink composition. When an oil-soluble dye is used as the colorant, the amount of the oil-soluble dye is particularly preferably 0.2 to 6% by weight based on the total mass (including the solvent) of the ink composition.

(Additives)

The ink composition of the invention can contain various additives together as necessary in addition to the essential components. These arbitrary components will be described below.

—UV Absorber—

The ink composition of the invention may contain a UV absorber from the viewpoint of improving the weather resistance of an image to be obtained and of preventing discoloration.

The UV absorbers include, for example, benzotriazole compounds described in JP-A Nos. 58-185677, 61-190537, 2-782, 5-197075 and 9-34057; benzophenone compounds described in JP-A Nos. 46-2784, 5-194483 and U.S. Pat. No. 3,214,463; cinnamic acid compounds described in JP-B Nos. 48-30492, 56-21141 and 10-88106; triazine compounds described in JP-A Nos. 4-298503, 8-53427, 8-239368, 10-182621 and Japanese Patent Application National Publication (Laid-Open) No. 8-501291; compounds described in Research Disclosure No. 24239; and compounds represented by stilbene and benzoxazole compounds, which absorb ultraviolet rays to emit fluorescence, the so-called fluorescent brightening agents.

The amount thereof added is appropriately selected according to the intended application and is generally on the order of 0.01 to 10% by weight based on the total amount (total mass) of the ink composition.

—Antioxidant—

For improving stability, an antioxidant can be added to the ink composition of the invention. The antioxidants include those described in European Patent Application Laid-Open No. 223739, European Patent Application Laid-Open No. 309401, European Patent Application Laid-Open No. 309402, European Patent Application Laid-Open No. 310551, European Patent Application Laid-Open No. 310552 and European Patent Application Laid-Open No. 459-416, German Patent Laid-Open No. 3435443, JP-A Nos. 54-48535, 62-262047, 63-113536, 63-163351, 2-262654, 2-71262, 3-121449, 5-61166, 5-119449, U.S. Pat. No. 4,814,262 and U.S. Pat. No. 4,980,275.

The amount of the antioxidant added is appropriately selected suitably depending on the object, but is generally about 0.01 to 10% by weight based on the total amount (total mass) of the ink composition.

—Antifading Agent—

The ink composition of the invention may employ various organic and metal complex antifading agents. The organic antifading agents include hydroquinones, alkoxyphenols, dialkoxyphenols, phenols, anilines, amines, indanes, chromans, alkoxyanilines, and heterocycles. The metal complex antifading agents include nickel complexes and zinc complexes. More specifically, there can be used compounds described in patents cited in Research Disclosure, No. 17643, Items VII-I to J, Research Disclosure, No. 15162, Research Disclosure, No. 18716, page 650, left-hand column, Research Disclosure, No. 36544, page 527, Research Disclosure, No. 307105, page 872, and Research Disclosure, No. 15162, and compounds contained in formulae and compound examples of typical compounds described in JP-A No. 62-215272, pages 127 to 137.

The amount thereof added is appropriately selected according to the intended application, but is preferably on the order of 0.01 to 10% by weight based on the total amount (total mass) of the ink composition.

—Conductive Salt—

For the purpose of controlling discharge properties, the ink composition of the invention, in particular, the ink composition for the inkjet recording may contain a conductive salt such as potassium thiocyanate, lithium nitrate, ammonium thiocyanate, or dimethylamine hydrochloride.

—Solvent—

It is also effective to add a trace amount of organic solvent to the ink composition of the invention in order to improve the adhesion to between a recording medium and the formed image.

Examples of the solvent include ketone-based solvents such as acetone, methyl ethyl ketone, and diethyl ketone, alcohol-based solvents such as methanol, ethanol, 2-propanol, 1-propanol, 1-butanol, and tert-butanol, chlorine-based solvents such as chloroform and methylene chloride, aromatic-based solvents such as benzene and toluene, ester-based solvents such as ethyl acetate, butyl acetate, and isopropyl acetate, ether-based solvents such as diethyl ether, tetrahydrofuran, and dioxane, and glycol ether-based solvents such as ethylene glycol monomethyl ether and ethylene glycol dimethyl ether.

In this case, the solvent is effectively added in such a range that deterioration in solvent resistance is not caused, and the amount of the solvent is preferably in the range of 0.1 to 5% by weight, more preferably 0.1 to 3% by weight, relative to the total amount of the ink composition.

—Polymer Compound—

The ink composition of the invention may contain various types of polymer compounds different in structure from (A) the specific polymer, in order to adjust film physical properties. Examples of the polymer compounds include acrylic polymers, polyvinylbutyral resins, polyurethane resins, polyamide resins, polyester resins, epoxy resins, phenol resins, polycarbonate resins, polyvinylbutyral resins, polyvinylformal resins, shellac, vinylic resins, acrylic resins, rubber-based resins, waxes, and other natural resins. They may be used in a combination of two or more types. Among these, a vinylic copolymer obtained by copolymerization of an acrylic monomer is preferable. As a copolymer component of the polymer compound, a copolymer including a "carboxyl group-containing monomer", an "alkyl methacrylate ester" or an "alkyl acrylate ester" as a structural unit may preferably be used.

Besides, the ink composition of the invention may as necessary contain, for example, a leveling additive, a matting agent, a wax for adjusting film physical properties, or a tackifier in order to improve the adhesion to a recording medium such as polyolefin or PET, the tackifier not inhibiting polymerization.

Specific examples of the tackifier include high molecular weight tacky polymers described on pp. 5-6 of JP-A No. 2001-49200 (e.g. a copolymer formed from an ester of (meth) acrylic acid and an alcohol having an alkyl group with 1 to 20 carbons, an ester of (meth)acrylic acid and an alicyclic alcohol having 3 to 14 carbons, or an ester of (meth)acrylic acid and an aromatic alcohol having 6 to 14 carbons), and a low molecular weight tackifying resin having a polymerizable unsaturated bond.

<Preferably Physical Properties of the Ink Composition>

The ink composition of the invention is cured with high sensitivity to form images excellent in blocking resistance and is preferably applied particularly to the inkjet recording method.

When the ink composition of the invention is applied to inkjet recording, the ink viscosity at jetting temperature is preferably 5 to 30 mPa·s, more preferably 7 to 20 mPa·s, in consideration of jetting properties. Accordingly, the composition ratio is appropriately regulated and determined preferably such that the above range is reached.

The viscosity of the ink composition at room temperature (25 to 30° C.) is preferably 7 to 120 mPa·s, more preferably 10 to 80 mPa·s. By setting the viscosity at room temperature high even if a porous recording medium is used, penetration of the ink into the recording medium can be prevented, uncured monomers can be reduced and the odor can be reduced. Furthermore, ink spreading when ink droplets have landed can be suppressed, and as a result there is the advantage that the image quality is improved.

The surface tension of the ink composition of the invention is preferably 20 to 40 mN/m, more preferably 20 to 30 mN/m. When the ink composition of the invention is recorded on various recording media such as polyolefin, PET, coated paper and non-coated paper, the surface tension thereof is preferably 20 mN/m or more for prevention of ink bleeding and penetration and 30 mN/m or less for wetting properties.

The ink composition of the invention can be used preferably as an inkjet recording ink. The inkjet recording system is not particularly limited and may be any known method such as an electrostatic control method which utilizes electrostatic attraction to jet ink, a drop-on-demand method (pressure pulse method) utilizing vibrational pressure of piezoelectric element, an acoustic ink jet method which includes converting electrical signal to acoustic beam with which the ink is irradiated to produce a radiation pressure that is utilized to jet the ink, and a thermal ink jet method which includes heating the ink to form bubbles that raise the pressure to jet the ink. The inkjet recording systems include a system of jetting a lot of small volume droplets of a so-called photo ink having a low concentration, a system of using multiple inks that have substantially the same hue and a different concentration for improving image quality, and a system of using a transparent and colorless ink.

Among them, the ink composition of the invention is preferable as an inkjet recording ink in a drop-on-demand system (pressure pulse system) of using a piezoelectric element.

<Inkjet Recording Method>

The ink composition of the invention can be used in an inkjet recording method including (a) jetting the ink composition onto a recording medium (image recording step) and (b) curing the ink composition by irradiating the jetted ink composition with active energy rays (image curing step).

That is, the inkjet recording method of the invention is a method including the image recording step and the image curing step, wherein an image is formed by inkjet recording.

In the image curing step in the invention, active energy rays are used in the image curing step, then a recording material is recorded with an image in the image recording step, then the recorded image is irradiated with active energy rays, thereby allowing the polymerizable compound contributing to image formation to proceed thus forming an excellently cured and highly rigid image.

In the image curing step, an exposure processing for promoting polymerization curing can be conducted with a light source for emitting an active energy ray in a wavelength region corresponding to the responsive wavelength of the ink composition. The light source, exposure time and light quantity may be selected appropriately depending on the degree of the polymerization curing of the polymerizable compound in the invention.

The thickness of the image cured in the image curing step is preferably 2 to 30 μm. As used herein, "the thickness of the image" refers to the thickness of a cured product of the image formed from the ink composition. When the thickness of the image is 2 to 30 μm, the image of from low to high density can be manifested.

In the image curing step, an exposure processing for promoting polymerization curing can be carried out with a light source for emitting an active energy ray in a wavelength range corresponding to the responsive wavelength of the ink composition. Specifically, a light source for emitting an active ray in the wavelength range of 250 to 450 nm, preferably 365±20 nm, for example, LD, LED (light emitting diode), a fluorescent lamp, a low-pressure mercury lamp, a high-pressure mercury lamp, a metal halide lamp, a carbon arc lamp, a xenon lamp, a chemical lamp or the like may be preferably used in curing. Preferable light sources include LED, a high-pressure mercury lamp, a metal halide lamp, and the like.

When curing with radical polymerization, the polymerization is inhibited with oxygen and can thus be carried out with curing in a state of low oxygen concentration, that is, curing the low energy by exposing in a gas atmosphere with nitrogen or the like.

One characteristics of the ink composition of the invention is that the function of (A) the specific polymer can suppress the polymerization inhibition with oxygen thereby attaining excellent curability without requiring the curing step in an inert gas atmosphere.

Prints obtained using this ink have an image area that has been cured by exposure to radiations such as ultraviolet rays to make the image area excellent in strength, and thus the product of the invention can be used as an ink receiving layer (image area) of a surface printing plate.

In the recording step, an inkjet recording method using an inkjet printer is preferably used. Specifically, the image recording step is conducted preferably by recording the image with the ink composition to be jetted by inkjet recording.

In the inkjet recording method, the ink composition is jetted preferably after the ink composition is heated to 40 to 80° C. and the viscosity of the ink composition is lowered to 30 mPa·s or less, preferably 20 mPa·s or less, and by using this method, high jetting stability can be realized. Commonly, radiation-curing ink compositions have higher viscosity than that of aqueous inks and are thus liable to a significant viscosity fluctuation range resulting from temperature fluctuation during printing. The viscosity fluctuation of the ink composition has great influences on the change of droplet size and droplet jetting speed, thus consequently leading to deterioration in image quality and thus the temperature of the ink composition during printing should be made as constant as possible. For this purpose, the recording method preferably has an ink temperature detection unit, an ink heating unit, and a regulating unit for regulating heating in accordance with the temperature of the ink detected.

The method of controlling the temperature is not particularly restricted. For instance, a temperature sensor is preferably disposed to each of plural piping sites to apply heating control corresponding to the flow rate of the ink composition and the environmental temperature. The heating head unit is preferably thermally shielded or insulated so as to minimize the environmental influence such as outdoor air against the unit itself. It is preferable to insulate the head unit from other units and reduce the heat capacity of the entire heating unit in order to shorten the start-up time needed for heating or in order to reduce the loss of heat energy. Alternatively, a unit for regulating applied energy to jet the ink in accordance with the temperature of the ink is also preferable.

The control range for the temperature of the ink composition is preferably ±5° C. relative to a set temperature, preferably ±2° C. relative to the set temperature, more preferably ±1° C. to the set temperature.

The amount of ink droplets landed onto a recording medium is preferably capable of being regulated in an arbitrary amount between 0.05 to 25 g/m$^2$ in order to realize excellent tone. For this realization, the size and numbers of ink droplets jetted from a head are preferably regulated.

When the distance between a head and a recording material is too long, the landing of ink droplets is disturbed by the movement of air accompanying the head or the recording material, thereby lowering the positional accuracy of landing. On the other hand, when the distance is too short, the head and the recording material may be contacted with each other due to the uneven surface of the recording material and vibration attributable to a delivery mechanism and thus the distance therebetween is preferably kept at about 0.5 to 2 mm.

Ink Set

The ink may be in one color, in cyan, magenta and yellow colors, in 4 colors that are these colors plus black, or in those colors further containing other specific colors. The colorant may be a dye or pigment. The order of jetting these inks may be such that the inks are landed with increasing brightness or with decreasing brightness, and the inks are landed preferably in a preferable order of image recording qualities.

When ink is superposed starting from one that is highest in the brightness, active energy rays comes easy to reach lower ink, thus making it possible to expect inhibition of curing sensitivity, reduction of residual monomers, reduction of odor, and an improvement in adhesiveness. The irradiation can be performed in block after all colors are discharged. However, exposure for every color is preferable from the viewpoint of promotion of the curing.

Image signals to be recorded are preferably subjected to signal processing to attain excellent color reproduction as described in, for example, JP-A No. 6-210905.

The use aspect of the ink composition of the invention is not limited to the inkjet recording method described above. The ink composition of the invention can be applied for example to the formation of an image wherein in the image recording step, an ink image is formed on a recording medium by a method other than inkjet recording and then irradiated with an active energy ray in the image curing step, or to the formation of an image wherein the ink composition is jetted with an inkjet recording unit, onto a recording material and then the image is cured.

The ink composition of the invention can be used not only to inkjet recording applications but also to three-dimensional modeling applications, for example, applications to formation of a printing ink-receiving part of the surface printing plate, as well as applications to can printing and foods. Among these applications, known methods can be utilized to form an image with reference to, for example, Japanese Patent No. 2979586 or the like.

[Recording Medium]

Both an ink-penetrable recording medium and a non-ink-penetrable recording medium can be used as recording mediums used with the ink composition of the invention. Examples of the ink-penetrable recording media include plain paper, inkjet-exclusive paper, coated paper, electrophotographic common-use paper, cloth, nonwoven fabric, porous film, polymer absorbent, and the like. These recording media are described as the "recording materials" in JP-A No. 2001-1891549 and others.

Examples of the non-ink-penetrable recording media include art paper, synthetic resin, rubber, resin-coated paper, glass, metal, ceramics, wood, and the like. In addition, a composite material in combination with these materials may also be used for expression of other functions.

Any synthetic resins may be used as the synthetic resin, and examples thereof include polyesters such as polyethylene terephthalate and polybutadiene terephthalate, polyolefins such as polyvinyl chloride, polystyrene, polyethylene, polyurethane and polypropylene, acrylic resins, polycarbonate, acrylonitrile-butadiene-styrene copolymers, diacetate, triacetate, polyimide, cellophane, celluloid, and the like.

The shape (thickness) of a substrate using the synthetic resin may be in the shape of film, card, or block and can be suitably selected for desired purposes without particular limitation. The synthetic resin may be transparent or opaque. The synthetic resin is preferably used as in the shape of so-called soft packaging film, and various non-absorptive plastics and the films thereof may be used. Examples of the various plastic films include polyethylene terephthalate (PET) film, biaxially orientated polystyrene (OPS) film, biaxially orientated polypropylene (OPP) film, biaxially orientated nylon (ONy) film, polyvinyl chloride (PVC) film, polyethylene (PE) film and triacetyl cellulose (TAC) film.

Examples of the resin-coated papers include transparent polyester film, opaque polyester film, opaque polyolefin resin film, paper supports laminated with a polyolefin resin on both faces and particularly preferable are the paper supports laminated with a polyolefin resin on both faces.

As described above, image recording using the ink composition of the invention can be used to give images which are cured with high sensitivity, are free from surface tackiness and are free of change in tack with time, so that the resulting print has an image excellent in blocking resistance, and the prints even when stored and delivered in a laminated state are free of deterioration in workability attributable to adhesion of an image region to its adhesive non-image medium.

Exemplary aspects of the invention are enumerated as below:

<1> An ink composition comprising:

(A) a polymer compound having (a-1) a photoradical generation site and (a-2) at least one segregation site selected from a fluoroalkyl group, a siloxane structure, and a long-chain alkyl group;

(B) a radical-polymerizable compound, and (C) a photoradical generator having a structure different from that of (A).

<2> The ink composition of <1>, wherein the polymer compound (A) comprises, as a structural unit containing a photoradical generation site (a-1), at least one structural unit represented by any of formulae (a-1-1) to (a-1-7), or at least one structural unit represented by formulae (a-1-8) or (a-1-9):

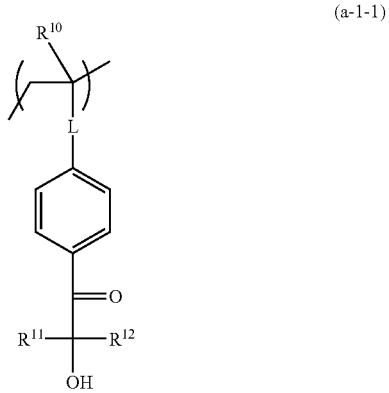

(a-1-1)

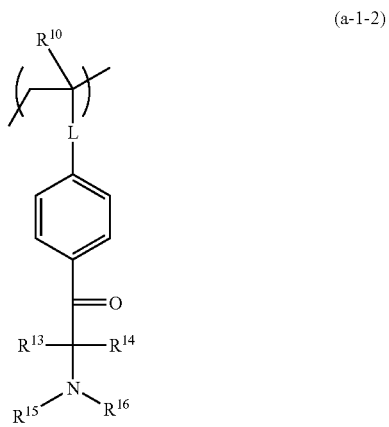

(a-1-2)

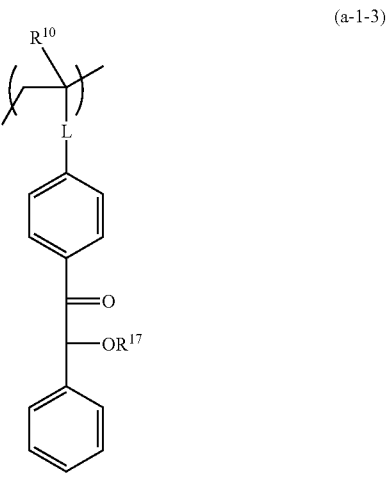

(a-1-3)

(a-1-4)

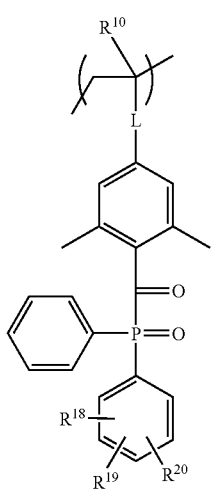

wherein R$^{10}$ represents a hydrogen atom or a methyl group; L represents a single bond or a divalent linking group; R$^{11}$, R$^{12}$, R$^{13}$ and R$^{14}$ each independently represent a linear, branched or cyclic hydrocarbon group having 1 to 12 carbon atoms which may have a substituent; R$^{11}$ and R$^{12}$, and R$^{13}$ and R$^{14}$ may be bound to form a cyclic structure having a cycle consisting of 8 or less carbon atoms;

R$^{15}$ and R$^{16}$ each independently represent a linear, branched or cyclic hydrocarbon group having 1 to 12 carbon atoms which may have a substituent;

R$^{17}$ represents a hydrogen atom or a linear or branched alkyl group having 1 to 6 carbon atoms; and R$^{18}$, R$^{19}$, and R$^{20}$ each independently represent a hydrogen atom or a hydrocarbon group having 1 to 12 carbon atoms;

(a-1-5)

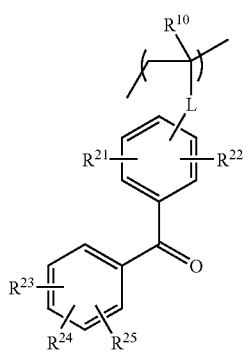

(a-1-6)

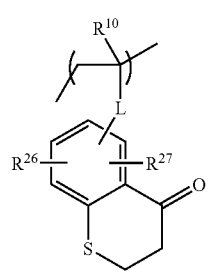

(a-1-7)

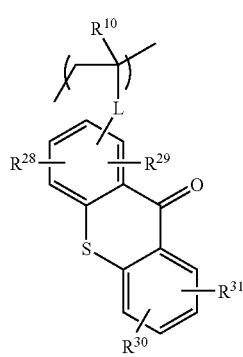

wherein R$^{21}$, R$^{22}$, R$^{23}$, R$^{24}$ and R$^{25}$ each independently represent a hydrogen atom, a linear, branched or cyclic alkyl group having 1 to 8 carbon atoms, a phenyl group, a hydroxyl group, or an alkyl group-substituted amine group, and two of R$^{21}$, R$^{22}$, and R$^{23}$ to R$^{25}$ may be bound to each other to form a ring structure; R$^{26}$ and R$^{27}$ each represent a hydrogen atom, an alkyl group having 1 to 6 carbon atoms, or a halogen atom;

R$^{28}$, R$^{29}$, R$^{30}$ and R$^{31}$ each independently represent a hydrogen atom, a linear or branched alkyl group having 1 to 6 carbon atoms, a halogen atom, or a hydroxyl group; and R$^{10}$ and L have the same meanings as defined in the formula (a-1-1);

(a-1-8)

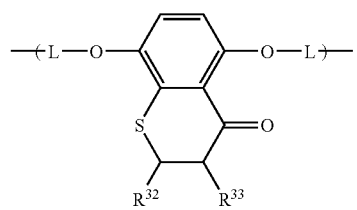

(a-1-9)

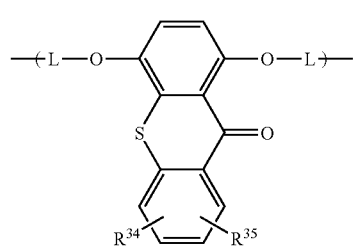

wherein R$^{32}$, R$^{33}$, R$^{34}$ and R$^{35}$ each independently represent a hydrogen atom, a hydroxyl group, a halogen atom, or a linear or branched alkyl, alkenyl or alkynyl group having 1 to 20 carbon atoms, and the alkyl group may, in its alkyl chain, have non-consecutive oxygen atoms; and L has the same meaning as defined in the formula (a-1-1).

<3> The ink composition of <1> or <2>, wherein a weight-average molecular weight of (A) the polymer compound is from 5000 to 100,000.

<4> The ink composition of any one of <1> to <3>, wherein (A) the polymer compound further includes (a-3) a radical polymerization site.

<5> The ink composition of any one of <1> to <4>, wherein a glass transition temperature (Tg) of (A) the polymer compound determined by differential scanning calorimetry (DSC) is 20 to 80° C.

<6> A method for inkjet recording, the method comprising:

(i) jetting the ink composition according to any one of <1> to <5> onto a recording medium, and (ii) irradiating the jetted ink composition with an active energy ray, to cure the ink composition.

EXAMPLES

Hereinafter, the present invention will be described with reference to the Examples, but the invention is not limited thereto.

Synthesis Example 1

1. Synthesis of Synthetic Monomer 1

A 500-mL three-neck flask was charged with 263 g of chloroform, 50.1 g of phenoxyethyl acrylate and 36.7 g of benzoyl chloride, and the mixture was stirred on an ice bath at 0° C., while 34.7 g of aluminum chloride was added thereto, and the mixture was reacted at room temperature for 8 hours. The reaction mixture was washed with sodium bicarbonate water and then with water, dried over calcium chloride and fractionated through a column into the object product to give a synthetic monomer 1 with 66% yield having the structure shown below.

2. Synthesis of Synthetic Monomer 2

A synthetic monomer 2 having the structure shown below was obtained with 60% yield in the same manner as in synthesis of the synthetic monomer 1 except that 4-cyanobenzoyl chloride was used in place of benzoyl chloride, and the reaction was carried out for 24 hours.

3. Synthesis of Synthetic Monomer 3

A synthetic monomer 3 was obtained with 62% yield in the same manner as in synthesis of the synthetic monomer 1 except that 4-methylbenzoyl chloride was used in place of benzoyl chloride, and the reaction was carried out for 12 hours.

4. Synthesis of Synthetic Monomer 4

A synthetic monomer 4 was obtained with 64% yield in the same manner as in synthesis of the synthetic monomer 1 except that 4-methoxybenzoyl chloride was used in place of benzoyl chloride, and the reaction was carried out for 12 hours.

Synthetic Monomer 1

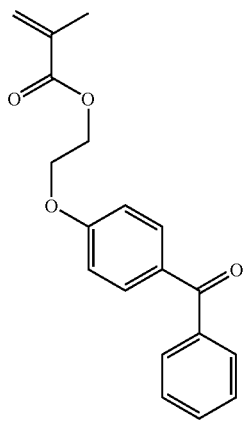

Synthetic Monomer 2

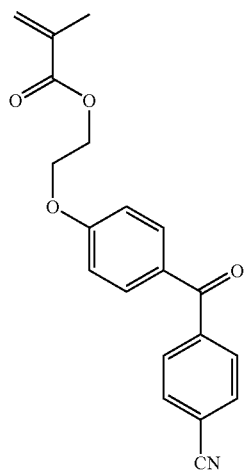

Synthetic Monomer 3

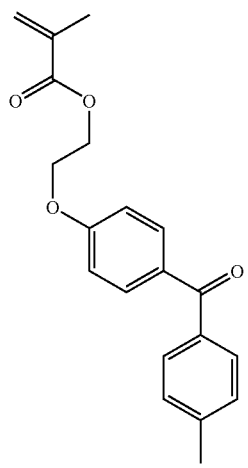

Synthetic Monomer 4

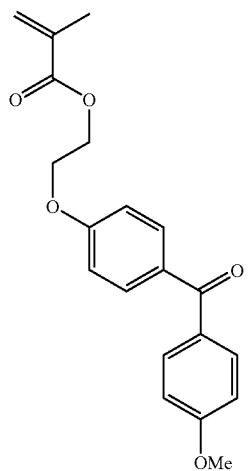

5. Synthesis of Synthetic Monomer 5

A synthetic monomer 5 having the structure shown below was obtained with 90% yield in the same manner as described in Macromol. Chem. Phys. 2006, 207, 1080-1086.

6. Synthesis of Synthetic Monomer 6

60 g of hydroxyethyl benzene thiol and 44.7 g of chloride acrylate were reacted in 244 g of pyridine at 25° C. for 4 hours and then formed by distillation into 2-(phenylthio)ethyl acrylate with 80% yield. A synthetic monomer 6 was obtained with 82% yield in the same manner as in Synthesis Example 1 except that 2-(phenylthio)ethyl acrylate was used in place of phenoxyethyl acrylate.

7. Synthesis of Synthetic Monomer 7

A synthetic monomer 7 was obtained with 65% yield in the same manner as in synthesis of the synthetic monomer 1 except that 4-phenylbenzoyl chloride was used in place of benzoyl chloride, and the reaction was carried out for 12 hours.

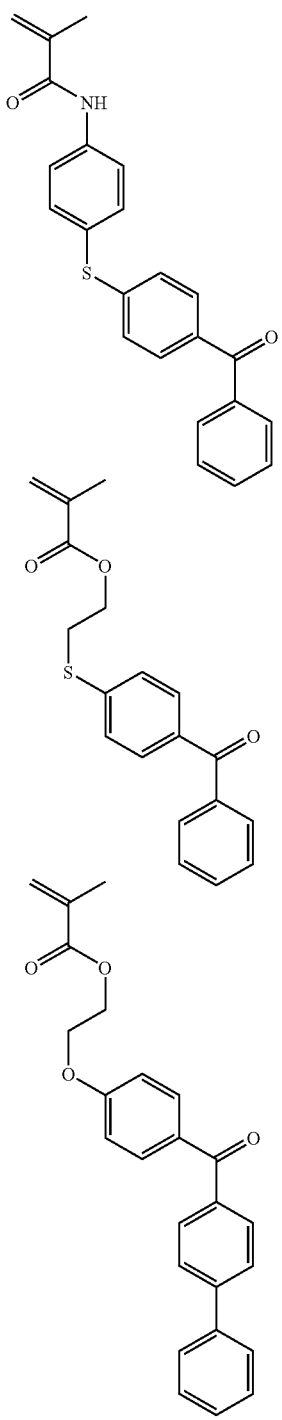

Synthetic Monomer 5

Synthetic Monomer 6

Synthetic Monomer 7

8. Synthesis of Synthetic Monomer 8

2.42 g of Compound B having the structure below and 0.10 g of DMAP (dimethyl amiopyridine) were dissolved in 20 mL THF and then 2.32 g of Compound C having the structure below was added. Then, the mixture was cooled to 0° C. on a cooling bath, and DCC (dicyclohexyl carbodiimide) was added gradually. Then, the temperature of the mixture was increased to room temperature followed by stirring for 3 hours. After the reaction was finished, water was added to the reaction solution which was then extracted with ethyl acetate. The extract was washed with dilute hydrochloric acid, then washed with saturated saline, dried over magnesium sulfate and filtered, and the filtrate was concentrated with an evaporator. The concentrated filtrate was purified with a silica gel column to give a synthetic monomer 8 with a yield of 2.8 g having the structure below. The compound B can be synthesized by a method described in JP-A No. 2-255677.

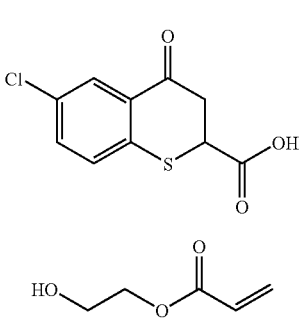

Compound B

Compound C

9. Synthesis of Synthetic Monomer 9

2.08 g of Compound A having the structure below was dissolved in 10 mL of 2-butanone and then added to 1.11 g of triethylamine. Further, the mixture was cooled to 0° C. on a cooling bath, and 1.00 g of acrylic acid chloride was added gradually. Thereafter, the temperature of the mixture was increased to room temperature followed by stirring for 3 hours. After the reaction was finished, water was added to the reaction solution which was then extracted with ethyl acetate. The extract was washed with saturated saline, then dried over magnesium sulfate and filtered, and the filtrate was concentrated with an evaporator. The concentrated filtrate was purified with a silica gel column to give a synthetic monomer 9 with a yield of 1.8 g having the structure below.

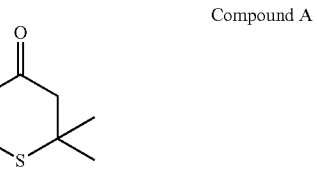

Compound A

10. Synthesis of Synthetic Monomer 10

A synthetic monomer 10 having the structure shown below was synthesized according to a method described in Macromol. Chem. Phys. 2002, 203, pp. 1486-1496.

Synthetic Monomer 8

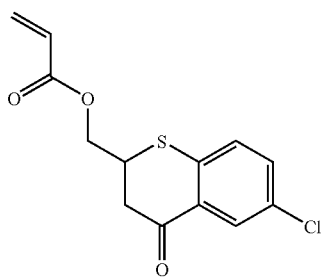

Synthetic Monomer 9

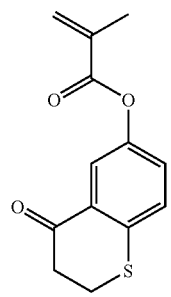

Synthetic Monomer 10

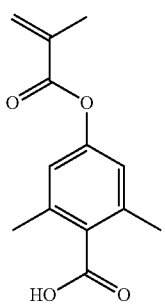

11. Synthesis of Synthetic Monomer 11

A small amount of NEOSTANE U600 was added to 10 g of KARENZ MOI (manufactured by Showa Denko K.K.) and 43.8 g of one-terminal hydroxyl group-modified silicone (manufactured by Chisso Corp.) in a 500-mL three-neck flask, and the mixture was reacted at 60° C. for 10 hours. The reaction mixture was recrystallized from IPA to give 53 g of Synthetic Monomer 11.

12. Synthesis of Synthetic Monomer 12

A synthetic monomer 12 having the structure shown below was obtained with 38% yield according to a method described in Polymer, 45, (2004), 5057-5063.

Synthetic Monomer 11

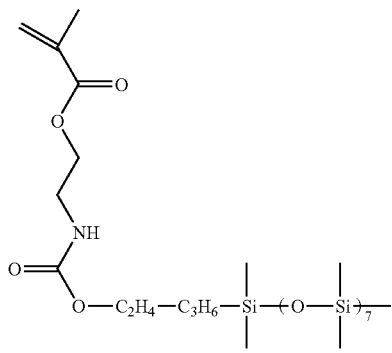

Synthetic Monomer 12

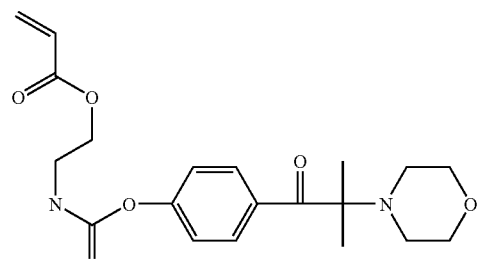

13. Synthesis of Synthetic Monomers 13 and 14

Synthetic Monomers 13 and 14 were synthesized according to a method described in "Journal of Heterocyclic Chemistry" (1990), 7(5), P. 1241-4 and obtained with 40% and 36% yields respectively.

Synthetic Monomer 13

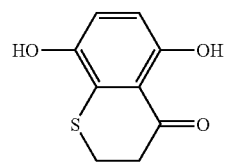

Synthetic Monomer 14

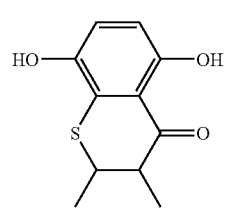

14. Synthesis of Synthetic Monomers 15 to 16

Synthetic Monomers 15 and 16 were synthesized according to a method described in Macromol. Rapid Commun. (2004), 25, pp. 748-752 and obtained with 55% and 62% yields respectively.

Synthetic Monomer 15

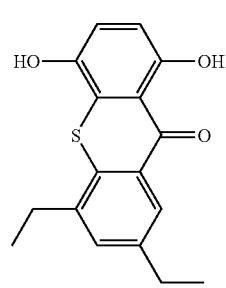

-continued

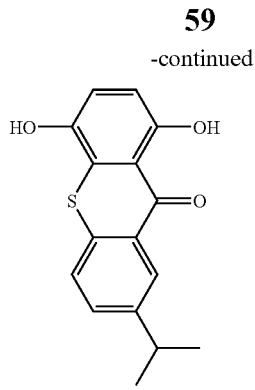

Synthetic Monomer 16

Synthesis Example 2

(A) Synthesis of Specific Polymer (a-1)

A 500-mL three-neck flask was charged with 68.2 g of a solvent methyl ethyl ketone (MEK), 20 g of a polymerizable compound styrene, 9.2 g of R-1620 (trade name, manufactured by Daikin Industries, Co.), and 0.066 g of a polymerization initiator V-65 (manufactured by Wako Pure Chemical Industries, Ltd.), and the mixture was reacted at 70° C. for 12 hours. Thereafter, 34.8 g of chloride 2-acetoxyisobutyrate, 21.4 g of triethylamine, and 28.2 g of aluminum chloride were added thereto at 0° C., then returned at room temperature (25° C.) and reacted at 24 hours. The reaction mixture was poured into a large amount of water, the resulting residues were dissolved in 50 g of THF, 10 g of methanol and 5 g of LiOH were added thereto, and the mixture was reacted at room temperature for 24 hours. The reaction mixture was dissolved in tetrahydrofuran (THF) and then poured onto a large amount of water thereby being re-precipitated; this re-precipitation purification was repeated 3 times. The specific polymer (a-1) was thus obtained.

Synthesis Example 3

(A) Synthesis of Specific Polymers (a-2) to (a-4)

Specific polymers (a-2) to (a-4) were obtained in the same manner as in synthesis of the specific polymer (a-1) except that the monomers in Table 1 below were added in place of the monomer R-1620 used in the Synthesis Example 2.

Synthesis Example 4

(A) Synthesis of Specific Polymers (a-5) to (a-15) and (a-17)

The monomer shown in the table and 30 wt % MEK were added to a 500-mL three-neck flask, and then V-65 (manufactured by Wako Pure Chemical Industries, Ltd.) was added in an amount of 0.15 mole and reacted at 70° C. for 12 hours. The mixture was dissolved in THF and poured into a large amount of hexane; this re-precipitation purification was repeated 3 times. Specific polymers (a-5) to (a-15) and (a-17) were thus obtained with yield of from 90% to 98%.

Synthesis Example 5

(A) Synthesis of Specific Polymer (a-16)

A 500-mL three-neck flask was charged with 30 g of toluene, 15 g of the synthesis monomer 10 shown in the table, 5.93 g of the synthetic monomer 11, and 0.024 g of V-65 (manufactured by Wako Pure Chemical Industries, Ltd.), and the mixture was reacted at 70° C. for 12 hours. Thereafter, the mixture was subjected to polymer reaction based on a description of Macromol. Chem. Phys. 2002, 203, 1486, and then poured into a large amount of hexane and filtered to give the specific polymer (a-16) with 64% yield.

Synthesis Example 6

(A) Synthesis of Specific Polymers (a-18) to (a-23)

A 500-mL three-neck flask was charged with the monomer shown in the table, 40 wt % MEK, 500 ppm of NEOSTANE U600 (manufactured by Nitto Kasei Co., Ltd.) and 750 ppm of TEMPO, and the mixture was reacted at 60° C. for 12 hours. A small amount of methanol was added to the mixture which was then reacted for 2 hours and poured into a large amount of hexane for re-precipitation purification. After filtration and drying, specific polymers a-18 and a-23 were obtained.

Synthesis Example 7

7-1. Synthesis of Comparative Compound 1

A 500-mL three-neck flask was charged with 68.2 g of a solvent methyl ethyl ketone (MEK), 20 g of a polymerizable compound styrene, 9.2 g of R-1620 (trade name, manufactured by Daikin Industries, Co.), and 0.066 g of a polymerization initiator V-65 (manufactured by Wako Pure Chemical Industries, Ltd.), followed by reaction at 70° C. for 12 hours, thereby giving 29 g of Comparative Compound 1 that is a copolymer compound having the same fluorine-based segregation surface site as in the specific polymer (a-1).

7-2. Comparative Compound 2

Comparative Example 2 is ESACURE KIP150 (polymer initiator having the following structural unit) manufactured by DAICEL UCB. This commercial product was re-precipitated with hexane, dried and used as solids.

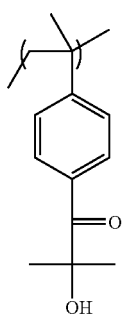

7-3. Comparative Compound 3

The following comparative compound 3, that is, a low-molecular-weight initiator having a surface segregation surface site, was synthesized by a method described in Japanese Patent Application National Publication (Laid-Open) No. 2004-506639.

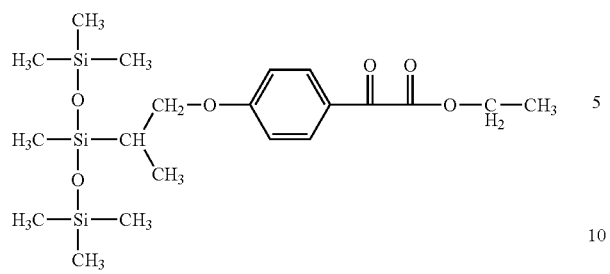

M = 456

TABLE 1

| Compound Example | Molecular Weight Mw | Molecular Weight Distribution Mw/Mn | Glass Transition Temperature Tg (° C.) | Monomer 1 | Monomer 2 Segregation site | Monomer 3 | Monomer 4 |
| --- | --- | --- | --- | --- | --- | --- | --- |
| a-1 | 25000 | 2.2 | 82 | Styrene | R-1620 | — | — |
| a-2 | 33000 | 2.4 | 80 | Styrene | R-1420 | — | — |
| a-3 | 46000 | 2.3 | 75 | Styrene | FM-0711 | — | — |
| a-4 | 12000 | 2.3 | 74 | Styrene | TM-0701 | — | — |
| a-5 | 65000 | 2.3 | 62 | Synthetic Monomer 1 | R-1620 | — | — |
| a-6 | 48000 | 2.2 | 60 | Synthetic Monomer 2 | R-1420 | — | — |
| a-7 | 43000 | 2.5 | 65 | Synthetic Monomer 3 | FM-0711 | — | — |
| a-8 | 36000 | 2.3 | 63 | Synthetic Monomer 1 | TM-0701 | — | — |
| a-9 | 56000 | 2.4 | 60 | Synthetic Monomer 5 | M-5610 | — | — |
| a-10 | 13000 | 2.3 | 50 | Synthetic Monomer 4 | M-5410 | 4-N,N-dimethylaminomethyl styrene | — |
| a-11 | 5000 | 2..3 | 23 | Synthetic Monomer 8 | TM-0701 | Dimethylaminoethyl methacrylate | — |
| a-12 | 8000 | 2.3 | 30 | Synthetic Monomer 6 | Dodecyl methacrylate | — | — |
| a-13 | 33000 | 2.3 | 10 | Synthetic Monomer 7 | Octadecyl methacrylate | MMA | Dimethylaminoethyl methacrylate |

TABLE 2

| Compound Example | Molecular Weight Mw | Molecular Weight Distribution Mw/Mn | Glass Transition Temperature Tg (° C.) | Monomer 1 | Monomer 2 Segregation site | Monomer 3 | Monomer 4 |
| --- | --- | --- | --- | --- | --- | --- | --- |
| a-14 | 45000 | 2.2 | 20 | Ebecryl P36 | FM-0711 | — | — |
| a-15 | 60000 | 2.4 | 50 | Synthetic Monomer 9 | FM-0711 | Dimethyl aminoethyl methacrylate | — |
| a-16 | 130000 | 2.5 | 55 | Synthetic Monomer 10 | Synthetic Monomer 11 | — | — |
| a-17 | 22000 | 2.1 | 43 | Synthetic Monomer 12 | FM-0711 | — | — |
| a-18 | 38000 | 2.6 | 82 | Synthetic Monomer 13 | x-22-176DX | Diphenyl methane isocyanate (MDI) | Hexamethylene diisocyanate (HMDI) |
| a-19 | 36000 | 2.5 | 86 | Synthetic Monomer 14 | x-22-176DX | 1,4-Phenylene diisocyanate | Tetramethylene diisocyanate |
| a-20 | 38000 | 2.4 | 78 | Synthetic Monomer 15 | x-22-176DX | Diphenyl methane isocyanate (MDI) | PPO1000 |
| a-21 | 40000 | 2.6 | 85 | Synthetic Monomer 16 | x-22-176DX | 1,4-Phenylene diisocyanate | Isophorone diisocyanate |
| a-22 | 46000 | 2.9 | 78 | Synthetic Monomer 17 | A-7612 | 1,4-Phenylene diisocyanate | Hexamethylene diisocyanate (HMDI) |
| a-23 | 45000 | 2.8 | 72 | Synthetic Monomer 18 | R-1620 | 1,5-Naphthalene diisocyanate | Tetramethylene diisocyanate |
| Comparative Compound 1 | 23000 | 2.3 | 95 | Styrene | R-1620 | — | — |
| Comparative Compound 2 | 26000 | 2.2 | 68 | EsacureKIP150 | — | — | — |
| Comparative Compound 3 | 456 | — | — | — | — | — | — |

Example 1

The following components were stirred with a high-speed water-cooling agitator, thereby yielding a magenta UV inkjet ink.

| (Magenta ink composition-1) | |
|---|---|
| Phenoxyethyl acrylate (B) component | 21.0 parts |
| N-vinyl caprolactam (B) component | 14.0 parts |
| FA-512A [structure below] (B component) | 17.4 parts |
| Specific polymer (A) component (compound in Tables 3 and 4) | 1.0 part |
| SOLSPERSE 36000 (dispersant manufactured by Noveon) | 2.0 parts |
| CINQUASIA MAZENTA RT-355 D (pigment: Ciba Specialty Chemicals) | 3.6 parts |
| GENORAD 16 (stabilizer manufactured by Rahn) | 0.05 part |
| RAPI-CURE DVE-3 (vinyl ether, (B) component, manufactured by ISP Europe) | 8.0 parts |
| DAROCUR TPO ((C) photopolymerization initiator manufactured by Ciba Specialty Chemicals) | 8.5 parts |
| IRGACURE 907 ((C) photopolymerization initiator manufactured by Ciba Specialty Chemicals) | 4.0 parts |
| BYK 307 (antifoaming agent manufactured by BYK Chemie) | 0.05 part |

Examples 2 to 23

Ink compositions were prepared in the same manner as in Example 1 except that the polymers shown in Tables 3 and 4 were used in place of (A) the specific polymer used in the example 1, and the same evaluation was conducted as in Example 1.

Comparative Examples 1 to 4

Ink compositions were prepared in the same manner as in Example 1 except that Comparative Compounds 1 to 3 obtained in Synthesis Example 7 shown in Table 4 were used in place of (A) the specific polymer used in the example 1 or without using any specific polymer or comparative compounds, and the same evaluation was conducted as in Example 1.

Example 24

The following components were stirred with a high-speed water-cooling agitator, thereby yielding a yellow UV inkjet ink.

| (Yellow ink composition-1) | |
|---|---|
| Phenoxyethyl acrylate (B) component | 21.0 parts |
| N-vinyl caprolactam (B) component | 14.0 parts |
| FA-512A [structure below] (B) component | 17.4 parts |
| Specific polymer (compound in Table) | 1.0 part |
| SOLSPERSE 36000 (dispersant manufactured by Noveon) | 2.0 parts |
| CROMOPHTAL YELLOWLA (pigment: Ciba Specialty Chemicals) | 3.6 parts |
| GENORAD 16 (stabilizer manufactured by Rahn) | 0.05 part |
| RAPI-CURE DVE-3 (vinyl ether, (B) component, manufactured by ISP Europe) | 8.0 parts |
| DAROCUR TPO ((C) photopolymerization initiator manufactured by Ciba Specialty Chemicals) | 8.5 parts |
| IRGACURE 907 ((C) photopolymerization initiator manufactured by Ciba Specialty Chemicals) | 4.0 parts |
| BYK 307 (antifoaming agent manufactured by BYK Chemie) | 0.05 part |

<Evaluation of Ink>

The yellow ink composition thus produced was printed on a polyvinyl chloride sheet, then passed at the predetermined rate under rays of an ultraviolet-emitting diode (UV-LED) and irradiated by regulation of specified light exposure. Prints with this ink were evaluated under the following criteria, and the results are shown in Tables 3 and 4 below.

<Inkjet Image Recording>

First, the prepared ink composition was filtered with a filter having an absolute filtration accuracy of 2 μm.

Then, a commercial inkjet recording device having a piezo system inkjet nozzle was used in recording a recording medium. The ink supply system includes a main tank, a supply pipe, an ink supply tank immediately before an inkjet head, a filter, and a piezo system inkjet head, and a section from the ink supply tank to the inkjet head was thermally insulated and heated. Temperature sensors were provided on the ink supply tank and in the vicinity of the nozzle of the inkjet head, and the temperature was controlled so that the nozzle section was always at 70° C.±2° C. The piezo system inkjet head was driven so as to discharge a multisize dot of 8 to 30 μL at a resolution of 720×720 dpi. The "dpi" as used herein means the number of dots per 2.54 cm.

Using the inkjet recording device, the ink composition after filtration was jetted at ambient temperature (25° C.) and irradiated by means of UV-LED, NCCUO33 manufactured by Nichia Corporation. The LED emits UV light at a wavelength of 365 nm from 1 chip, and by applying a current of about 500 mA, light of about 100 mW is emitted from the chip. Plural thereof were aligned at intervals of 7 mm to give a power of 0.3 W/cm$^2$ on the surface of a recording medium. The time from landing to exposure, and the exposure time, can be varied by the transport speed of the medium and the distance between a head and the LED in the transport direction. In this example, irradiation was carried out about 0.2 sec. after landing.

The exposure energy on the recording medium can be regulated between 0.01 to 15 J/cm$^2$, depending on the settings of the distance between the UV-LED and the recording medium and of the transport speed of the recording medium. The irradiation was continued until the feeling of tackiness disappeared on the image surface after irradiation with ultraviolet rays. As the recording medium, a flexible polyvinyl chloride sheet was used.

(Evaluation of Jetting Stability)

The ink composition (after filtration) obtained as described above was evaluated for its jetting stability through head nozzles in the following manner.

That is, the number of nozzles lost in continuous jetting for 60 minutes was measured with a commercial inkjet recording device having piezo system inkjet nozzles, under the following conditions.

—Conditions—
Number of channels: 318 per head
Drive frequency: 4.8 kHz/dot
Number of ink droplets: 7 droplets, 42 μL
Temperature: 45° C.

In this experiment, the ink composition was jetted onto a PET substrate and then exposed to rays (exposure: 1,000 mW/cm²), upon which lost nozzles (clogged nozzles) were counted.

—Evaluation Criteria—

A: The number of lost nozzles is 0 or more to less than 5.
B: The number of lost nozzles is 5 or more to less than 10.
C: The number of lost nozzles is 10 or more.

(Evaluation of Transfer Sensitivity)

The exposure energy intensity (mJ/cm²) when the feeling of tackiness disappeared on the image surface after irradiation with ultraviolet rays was defined as transfer sensitivity. The smaller the value, the higher the sensitivity.

The allowable range of transfer sensitivity in this evaluation method is 2000 mJ/cm² or less, more preferably 1500 mJ/cm² or less.

(Evaluation of Abrasion Resistance)

A sample having a solid image printed at a resolution of 720×720 dpi on a flexible polyvinyl chloride sheet was rubbed with an eraser (trade name: K-50 PLASTIC ERASER KEEP, manufactured by Hoshiya), and its transfer onto the eraser was evaluated. The evaluation criteria are as follows:

—Evaluation Criteria—

A: There is no transfer.
C: There is transfer.

(Evaluation of Blocking Sensitivity)

On an image after irradiation with UV rays obtained by applying the inkjet recording method were stuck 500 sheets of PET (size: the same size as the flexible polyvinyl chloride having an image formed both in length and breadth, weight: 2 g/sheet), and then the PET was left for 1 day and evaluated visually for its transfer. A was given when there was no transfer, while C was given when there was transfer, and the exposure energy intensity (mJ/cm²) required for disappearance of transfer was defined as blocking sensitivity.

The allowable range of blocking sensitivity is 12,000 mJ/cm² or less, preferably 6,000 mJ/cm² or less.

(Evaluation of Stretching Ratio)

A cured film was prepared in the same manner as in the evaluation of exposure sensitivity except that the integrated exposure intensity was 12,000 mJ/cm², the illumination intensity was 2140 mW/cm², and FASSON PE (polyethylene film (film thickness: 100 μm) manufactured by Fasson) was used as a support in place of the flexible polyvinyl chloride. The resulting cured film was cut in sizes of 5 cm (shaft length)×2.5 cm (width) and stretched at a speed of 30 cm/min with a tensile strength machine (trade name: AUTOGRAPH AGS-J, manufactured by Shimadzu Corporation) to determine the degree of stretching at which the cured film was ruptured. The state stretched from the initial length to the twofold length was defined as 100%.

The allowable range of stretching ratio is 200% or more, more preferably 300% or more.

Example 25

The following components were stirred with a high-speed water-cooling agitator, thereby yielding a cyan UV inkjet ink.

| (Cyan ink composition-1) | |
|---|---|
| Phenoxyethyl acrylate (B) component | 21.0 parts |
| N-vinyl caprolactam (B) component | 14.0 parts |
| FA-512A [structure below] (B component) | 17.4 parts |
| Specific polymer (compound in Table) | 1.0 part |
| SOLSPERSE 36000 (dispersant manufactured by Noveon) | 2.0 parts |
| IRGALITE BLUE GLVO (pigment: Ciba Specialty Chemicals) | 3.6 parts |
| GENORAD 16 (stabilizer manufactured by Rahn) | 0.05 part |
| RAPI-CURE DVE-3 (vinyl ether, (B) component, manufactured by ISP Europe) | 8.0 parts |
| DAROCUR TPO ((C) photopolymerization initiator manufactured by Ciba Specialty Chemicals) | 8.5 parts |
| IRGACURE 907 ((C) photopolymerization initiator manufactured by Ciba Specialty Chemicals) | 4.0 parts |
| BYK 307 (antifoaming agent manufactured by BYK Chemie) | 0.05 part |

<Evaluation of Ink>

The cyan ink composition thus produced was printed on a polyvinyl chloride sheet, then passed at the predetermined rate under rays of an ultraviolet-emitting diode (UV-LED) and irradiated by regulation of specified light exposure. Prints with this ink were evaluated in the same manner as in Example 1. The results are shown in Tables 3 and 4 below.

Example 26

The following components were stirred with a high-speed water-cooling agitator, thereby yielding a black UV inkjet ink.

| (Black ink composition-1) | |
|---|---|
| Phenoxyethyl acrylate (B) component | 21.0 parts |
| N-vinyl caprolactam (B) component | 14.0 parts |
| FA-512A [structure below] (B) component | 17.4 parts |
| Specific polymer (compound in Table) | 1.0 part |
| SOLSPERSE 36000 (dispersant manufactured by Noveon) | 2.0 parts |
| MICROLITH Black C-K (pigment: Ciba Specialty Chemicals) | 2.6 parts |
| GENORAD 16 (stabilizer manufactured by Rahn) | 0.05 part |
| RAPI-CURE DVE-3 (vinyl ether, (B) component, manufactured by ISP Europe) | 8.0 parts |
| DAROCUR TPO ((C) photopolymerization initiator manufactured by Ciba Specialty Chemicals) | 8.5 parts |
| IRGACURE 907 ((C) photopolymerization initiator manufactured by Ciba Specialty Chemicals) | 4.0 parts |
| BYK 307 (antifoaming agent manufactured by BYK Chemie) | 0.05 part |

<Evaluation of Ink>

The black ink composition thus produced was printed on a polyvinyl chloride sheet, then passed at the predetermined rate under rays of an ultraviolet-emitting diode (UV-LED) and irradiated by regulation of specified light exposure. Prints with this ink were evaluated in the same manner as in Example 1. The results are shown in Tables 3 and 4 below.

Example 27

The following components were stirred with a high-speed water-cooling agitator, thereby yielding a white UV inkjet ink.

(White ink composition-3)
| | |
|---|---|
| •Phenoxyethyl acrylate (B) component | 21.0 parts |
| •N-vinyl caprolactam (B) component | 14.0 parts |
| •FA-512A [structure below] (B) component | 17.4 parts |
| •Specific polymer (compound in Table) | 1.0 part |
| •SOLSPERSE 36000 (dispersant manufactured by Noveon) | 2.0 parts |
| •MICROLITH WHITE R-A (pigment: Ciba Specialty Chemicals) | 15.0 parts |
| •GENORAD 16 (stabilizer manufactured by Rahn) | 0.05 part |
| •RAPI-CURE DVE-3 (vinyl ether, (B) component, manufactured by ISP Europe) | 8.0 parts |
| •DAROCUR TPO ((C) photopolymerization manufactured by Ciba Specialty Chemicals) | 8.5 parts |
| •IRGACURE 907 ((C) photopolymerization manufactured by Ciba Specialty Chemicals) | 4.0 parts |
| •BYK 307 (antifoaming agent manufactured by BYK Chemie) | 0.05 part |

(FA-512)

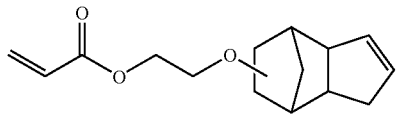

TABLE 3

| | (A) Specific Polymer or Comparative Compound | Transfer Sensitivity | Blocking Sensitivity | Abrasion Resistance | Stretching Ratio | Jetting Stability |
|---|---|---|---|---|---|---|
| Example 1 | a-1 | 1200 | 5000 | A | 220 | A |
| Example 2 | a-2 | 1200 | 5000 | A | 220 | A |
| Example 3 | a-3 | 1200 | 5000 | A | 220 | A |
| Example 4 | a-4 | 1200 | 5000 | A | 220 | A |
| Example 5 | a-5 | 1200 | 5000 | A | 220 | A |
| Example 6 | a-6 | 1200 | 5000 | A | 220 | A |
| Example 7 | a-7 | 1200 | 5000 | A | 220 | A |
| Example 8 | a-8 | 1200 | 5000 | A | 220 | A |
| Example 9 | a-9 | 1200 | 5000 | A | 220 | A |
| Example 10 | a-10 | 1200 | 5000 | A | 220 | A |
| Example 11 | a-11 | 1200 | 14000 | A | 220 | A |
| Example 12 | a-12 | 1200 | 7000 | A | 220 | A |
| Example 13 | a-13 | 1200 | 5000 | A | 220 | A |

TABLE 4

| | (A) Specific Polymer or Comparative Compound | Transfer Sensitivity | Blocking Sensitivity | Abrasion Resistance | Stretching Ratio | Jetting Stability |
|---|---|---|---|---|---|---|
| Example 14 | a-14 | 1200 | 5000 | A | 220 | A |
| Example 15 | a-15 | 1200 | 5000 | A | 220 | A |
| Example 16 | a-16 | 1200 | 5000 | A | 220 | A |
| Example 17 | a-17 | 1200 | 5000 | A | 220 | A |
| Example 18 | a-18 | 1200 | 5000 | A | 220 | A |
| Example 19 | a-19 | 1200 | 5000 | A | 220 | A |
| Example 20 | a-20 | 1200 | 5000 | A | 220 | A |
| Example 21 | a-21 | 1200 | 5000 | A | 220 | A |
| Example 22 | a-22 | 1400 | 7000 | A | 220 | A |
| Example 23 | a-23 | 1400 | 7000 | A | 220 | A |
| Example 24 | a-11 | 1200 | 5000 | A | 220 | A |
| Example 25 | a-11 | 1200 | 5000 | A | 220 | A |
| Example 26 | a-11 | 1200 | 5000 | A | 210 | A |
| Example 27 | a-11 | 1200 | 5000 | A | 230 | A |
| Comparative Example 1 | None | 2400 | 20000 | C | 220 | A |
| Comparative Example 2 | Comparative Compound 1 | 2400 | 12000 | A | 220 | A |
| Comparative Example 3 | Comparative Compound 2 | 2400 | 20000 | C | 220 | A |
| Comparative Example 4 | Comparative Compound 3 | 2400 | 20000 | C | 220 | C |

From the results in Tables 3 and 4, it can be seen that the ink compositions in the Examples, containing (A) the specific polymer in the invention, are cured with high sensitivity, and the resulting ink images significantly improve tack sensitivity and blocking sensitivity while maintaining flexibility.

It can been seen that even when the composition has a segregation site but has no photoradical polymerization site as shown in Comparative Example 2, and even when the composition has both of them but has a low-molecular-weight compound as shown in Comparative Example 3, their addition does not bring about the effect of the invention.

According to the invention, there can be provided an ink composition preferable for use in inkjet recording, which is curable with high sensitivity, with active energy rays, and can form images excellent in abrasion resistance and blocking resistance.

The ink composition of the invention can be used to provide an inkjet recording method capable of forming images excellent in blocking resistance on a recording material.

What is claimed is:

1. An ink composition comprising:
   (A) a polymer compound having (a-1) a photoradical generation site and (a-2) at least one segregation site selected from a group consisting of a fluoroalkyl group, a siloxane structure, and a long-chain alkyl group;
   (B) a radical-polymerizable compound, and
   (C) a photoradical generator having a structure different from that of (A).

2. The ink composition of claim 1, wherein the polymer compound (A) comprises, as a structural unit containing a photoradical generation site (a-1), at least one structural unit represented by any of formulae (a-1-1) to (a-1-7), or at least one structural unit represented by formulae (a-1-8) or (a-1-9):

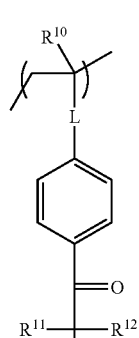

(a-1-1)

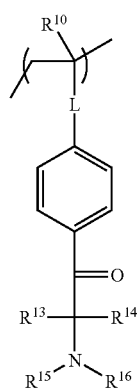

(a-1-2)

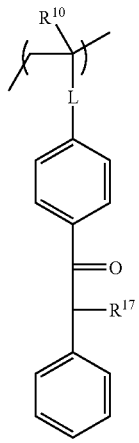

(a-1-3)

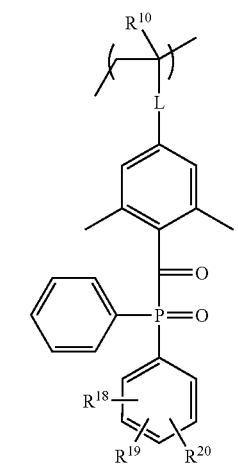

(a-1-4)

wherein $R^{10}$ represents a hydrogen atom or a methyl group; L represents a single bond or a divalent linking group; $R^{11}$, $R^{12}$, $R^{13}$ and $R^{14}$ each independently represent a linear, branched or cyclic hydrocarbon group having 1 to 12 carbon atoms which may have a substituent; $R^{11}$ and $R^{12}$, and $R^{13}$ and $R^{14}$ may be bound to form a cyclic structure having a cycle consisting of 8 or less carbon atoms;

$R^{15}$ and $R^{16}$ each independently represent a linear, branched or cyclic hydrocarbon group having 1 to 12 carbon atoms which may have a substituent;

$R^{17}$ represents a hydrogen atom or a linear or branched alkyl group having 1 to 6 carbon atoms; and $R^{18}$, $R^{19}$, and $R^{20}$ each independently represent a hydrogen atom or a hydrocarbon group having 1 to 12 carbon atoms;

(a-1-5)

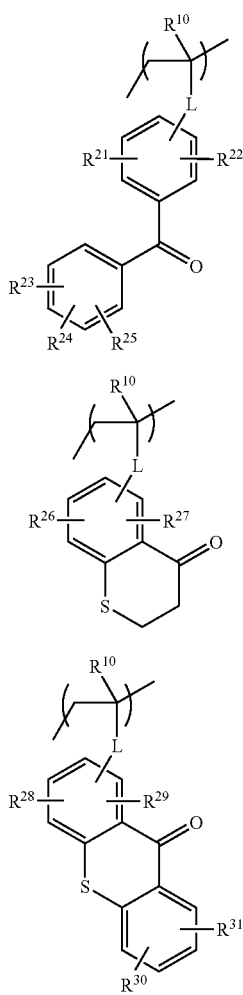

(a-1-6)

(a-1-7)

wherein $R^{21}$, $R^{22}$, $R^{23}$, $R^{24}$ and $R^{25}$ each independently represent a hydrogen atom, a linear, branched or cyclic alkyl group having 1 to 8 carbon atoms, a phenyl group, a hydroxyl group, or an alkyl group-substituted amine group, and two of $R^{21}$, $R^{22}$, and $R^{23}$ to $R^{25}$ may be bound to each other to form a ring structure; $R^{26}$ and $R^{27}$ each represent a hydrogen atom, an alkyl group having 1 to 6 carbon atoms, or a halogen atom;

$R^{28}$, $R^{29}$, $R^{30}$ and $R^{31}$ each independently represent a hydrogen atom, a linear or branched alkyl group having 1 to 6 carbon atoms, a halogen atom, or a hydroxyl group; and $R^{10}$ and L have the same meanings as defined in the formula (a-1-1);

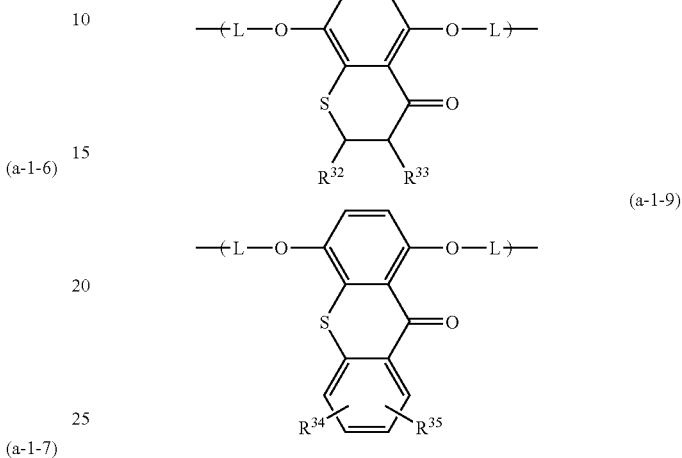

(a-1-8)

(a-1-9)

wherein $R^{32}$, $R^{33}$, $R^{34}$ and $R^{35}$ each independently represent a hydrogen atom, a hydroxyl group, a halogen atom, or a linear or branched alkyl, alkenyl or alkynyl group having 1 to 20 carbon atoms, and the alkyl group may, in its alkyl chain, have non-consecutive oxygen atoms; and L has the same meaning as defined in the formula (a-1-1).

3. The ink composition of claim 1, wherein a weight-average molecular weight of (A) the polymer compound is from 5000 to 100,000.

4. The ink composition of any one of claim 1, wherein (A) the polymer compound further includes (a-3) a radical polymerization site.

5. The ink composition of claim 1, wherein a glass transition temperature (Tg) of (A) the polymer compound determined by differential scanning calorimetry (DSC) is 20 to 80° C.

6. A method for inkjet recording, the method comprising:
(i) jetting the ink composition of claim 1 onto a recording medium, and
(ii) irradiating the jetted ink composition with an active energy ray, to cure the ink composition.

* * * * *